(12) United States Patent
Yamamoto et al.

(10) Patent No.: US 8,947,771 B2
(45) Date of Patent: Feb. 3, 2015

(54) OPTICAL AMPLIFYING DEVICE

(75) Inventors: Koei Yamamoto, Hamamatsu (JP);
Toshiharu Moriguchi, Hamamatsu (JP);
Shingo Oishi, Hamamatsu (JP);
Masatoshi Fujimoto, Hamamatsu (JP);
Shigeru Sakamoto, Hamamatsu (JP);
Hironori Takahashi, Hamamatsu (JP);
Haruyasu Ito, Hamamatsu (JP); Yoichi Kawada, Hamamatsu (JP); Shinichiro Aoshima, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 1301 days.

(21) Appl. No.: 12/307,080

(22) PCT Filed: Jul. 11, 2007

(86) PCT No.: PCT/JP2007/063822
§ 371 (c)(1),
(2), (4) Date: Dec. 23, 2009

(87) PCT Pub. No.: WO2008/007707
PCT Pub. Date: Jan. 17, 2008

(65) Prior Publication Data
US 2010/0091359 A1     Apr. 15, 2010

(30) Foreign Application Priority Data
Jul. 12, 2006   (JP) ................ P2006-191847

(51) Int. Cl.
*H01S 3/081*       (2006.01)
*H01S 3/23*        (2006.01)
(Continued)

(52) U.S. Cl.
CPC ............. *H01S 3/2333* (2013.01); *H01S 3/0057* (2013.01); *H01S 3/2325* (2013.01);
(Continued)

(58) Field of Classification Search
USPC .................................. 359/346, 347
See application file for complete search history.

(56) References Cited

U.S. PATENT DOCUMENTS 5,048,030 A * 9/1991 Hiiro .............................. 372/68
5,546,222 A * 8/1996 Plaessmann et al. ......... 359/346
(Continued)

FOREIGN PATENT DOCUMENTS

CN    1588221      3/2005
JP    H5-267753    10/1993
(Continued)

OTHER PUBLICATIONS

"Todd E. Olson et al., Multipass Diode-Pumped Nd:YAG Optical Amplifiers At 1.06 μm, and 1.32 μm", IEEE Photonics Technology Letters, vol. 6, No. 5, May 1994, pp. 605-608.
(Continued)

*Primary Examiner* — Eric Bolda
(74) *Attorney, Agent, or Firm* — Drinker Biddle & Reath LLP

(57) ABSTRACT

The present invention provides an optical amplifying device which can be easily downsized, increased in output, and stabilized. An optical amplifying device 1A includes an optical amplifier 10A and an energy supplier 30. The optical amplifier 10A includes an optical amplifying medium 11 and a transparent medium 12. The energy supplier 30 supplies excitation energy (for example, excitation light) to the optical amplifying medium 11. The optical amplifying medium 11 is supplied with the excitation light to amplify light and output it. To-be-amplified light passes through the transparent medium 12 in the optical amplifying medium 11 a plurality of times. The transparent medium 12 can propagate the to-be-amplified light, for example, zigzag inside.

23 Claims, 33 Drawing Sheets

(51) Int. Cl.
| | | |
|---|---|---|
| *H01S 3/00* | (2006.01) | |
| *H01S 3/02* | (2006.01) | |
| *H01S 3/04* | (2006.01) | |
| *H01S 3/042* | (2006.01) | |
| *H01S 3/06* | (2006.01) | |
| *H01S 3/08* | (2006.01) | |
| *H01S 3/083* | (2006.01) | |
| *H01S 3/0941* | (2006.01) | |

(52) U.S. Cl.
CPC .............. *H01S 3/027* (2013.01); *H01S 3/0407* (2013.01); *H01S 3/042* (2013.01); *H01S 3/0606* (2013.01); *H01S 3/0621* (2013.01); *H01S 3/0623* (2013.01); *H01S 3/08095* (2013.01); *H01S 3/083* (2013.01); *H01S 3/09415* (2013.01); *H01S 3/2316* (2013.01); *H01S 3/235* (2013.01)
USPC .......................................... 359/346; 359/347

(56) References Cited

U.S. PATENT DOCUMENTS

| | | | |
|---|---|---|---|
| 5,554,156 A | 9/1996 | Shimizu | |
| 5,555,254 A * | 9/1996 | Injeyan et al. | 372/33 |
| 5,563,899 A | 10/1996 | Meissner et al. | |
| 5,572,358 A * | 11/1996 | Gabl et al. | 359/347 |
| 5,684,623 A | 11/1997 | King et al. | 359/346 |
| 5,738,681 A | 4/1998 | Shimizu | |
| 5,754,333 A | 5/1998 | Fulbert et al. | |
| 5,928,223 A | 7/1999 | Shimizu | |
| 6,268,956 B1 | 7/2001 | Injeyan et al. | |
| 6,389,045 B1 * | 5/2002 | Mann et al. | 372/25 |
| 6,654,163 B1 * | 11/2003 | Du et al. | 359/347 |
| 6,700,698 B1 * | 3/2004 | Scott | 359/347 |
| 2003/0012246 A1 * | 1/2003 | Klimek et al. | 372/70 |
| 2004/0246583 A1 | 12/2004 | Mueller et al. | |
| 2006/0039436 A1 | 2/2006 | Lei et al. | |
| 2006/0103918 A1 * | 5/2006 | Damzen | 359/333 |
| 2008/0037604 A1 * | 2/2008 | Savage-Leuchs | 372/44.01 |

FOREIGN PATENT DOCUMENTS

| | | |
|---|---|---|
| JP | 6-277227 | 10/1994 |
| JP | 10-268369 | 10/1998 |
| JP | 11-214780 | 8/1999 |
| JP | 11-274664 | 10/1999 |
| JP | 2001-251002 | 9/2001 |
| JP | 2003-152252 | 5/2003 |
| JP | 3540741 | 4/2004 |
| JP | 2004-165652 | 6/2004 |
| JP | 2005-513791 | 5/2005 |
| RU | 2 264 012 | 11/2005 |
| WO | WO 2004/068656 | 8/2004 |
| WO | WO 2005/053118 | 6/2005 |
| WO | WO 2006/114969 A1 | 11/2006 |

OTHER PUBLICATIONS

"Paul Beaud et al., 8-TW 90-fs Cr:LiSAF laser". Optic Letters, vol. 18, No. 18, Sep. 15, 1993, pp. 1550-1552.

"J. Harrison et al., Thermal Modeling for Mode-Size Estimation in Microlasers with Application to Linear Arrays in Nd:YAG and Tm,Ho:YLF", IEEE Journal of Quantum Electronics, vol. 30, No. 11, Nov. 1994, pp. 2628-2633.

\* cited by examiner

OPTICAL AMPLIFYING DEVICE

TECHNICAL FIELD

The present invention relates to an optical amplifying device.

BACKGROUND ART

A high-intensity ultra-short pulse laser light source which generates pulsed light having a pulse duration of approximately picoseconds to femtoseconds has a large size, and is normally set on an optical table and used. Respective optical components of the laser light source are held in a free space by a mount with adjusting functions. From this fact, the laser light source has many points to be adjusted, and such adjustments are not easy.

On the other hand, a fiber laser light source using an optical fiber as an optical amplifying medium is increased in energy, and utilization by industry such as laser machining has been attempted. The fiber laser light source mostly solves the above-described problem, and in the case of continuous output, a fiber laser light source with a high output is realized like a fiber disk laser light source.

However, in the fiber laser light source, the optical fiber limits the beam cross section to be small, so that in a pulsed output, the pulse energy is limited to approximately several µJ, and a high output cannot be realized. Thus, there is no laser light source which is small in size, has a high output, is excellent in stability, and is easily adjusted; therefore, in actuality, use of the high-intensity ultra-short pulse laser light source is limited to research purposes.

As an optical amplifying device which is intended to be downsized and stabilized, configurations disclosed in Patent Document 1 and 2 are known. The optical amplifying device disclosed in Patent Document 1 is capable of conveniently increasing the resonator length, and has a small-sized optical resonator. The optical amplifying device disclosed in Patent Document 2 includes an optical resonator having a polarization maintaining optical fiber provided on a resonant optical path separately from an optical amplifying medium.

Patent Document 1: Japanese Patent No. 3540741

Patent Document 2: Japanese Published Unexamined Patent Application No. 2004-165652

DISCLOSURE OF THE INVENTION

Problem to be Solved by the Invention

However, in the optical amplifying device disclosed in Patent Document 1, light propagates in the atmosphere in the optical resonator, so that the resonator length gets long and downsizing is limited. The optical amplifying device disclosed in Patent Document 2 has an optical fiber in the optical resonator, so that downsizing can be realized, however, in a pulsed output, the pulse energy is limited to approximately several µJ, and a high output cannot be realized.

The present invention was made for solving the above-described problem, and an object thereof is to provide an optical amplifying device which can be easily downsized, increased in output, and stabilized.

Means for Solving the Problem

An optical amplifying device of the present invention includes (1) an optical amplifier including an optical amplifying medium which optically amplifies to-be-amplified light and a transparent medium which the to-be-amplified light passes a plurality of times through; and (2) an energy supplier which supplies excitation energy to the optical amplifying medium. In this optical amplifying device, the optical amplifying medium amplifies light by being supplied with excitation energy from the energy supplier and outputs it. The to-be-amplified light passes through the transparent medium in the optical amplifying device a plurality of times. The transparent medium can propagate the to-be-amplified light, for example, zigzag inside. It is preferable that the optical amplifier inputs to-be-amplified light from the outside and optically amplifies the to-be-amplified light by making amplified light thereof pass through the optical amplifying medium a plurality of times.

It is preferable that the optical amplifier includes an optical resonator which resonates to-be-amplified light, and has the optical amplifying medium and transparent medium on a resonant optical path of this optical resonator. In this case, the optical amplifying device has a laser oscillation function capable of generating laser light by causing laser oscillation inside the optical resonator.

It is preferable that the optical amplifier includes an optical resonator which resonates to-be-amplified light, and further includes (a) a light taking-in means which is provided on the resonant optical path and takes-in to-be-amplified light into the resonant optical path from the outside of the optical resonator; and (b) a light taking-out means which is provided on the resonant optical path and takes-out the to-be-amplified light which was optically amplified inside the optical resonator for a predetermined period to the outside of the optical resonator. In this case, the optical amplifying device has a regenerative amplification function capable of amplifying laser light in the optical resonator.

It is characterized that an optical amplifying device of the present invention uses light generated by the above-described optical amplifying device (hereinafter, referred to as "first optical amplifying device") of the present invention as to-be-amplified light, and optically amplifies the to-be-amplified light by the above-described optical amplifying device (hereinafter, referred to as "second optical amplifying device") of the present invention and outputs it. It is preferable that the first optical amplifying device and the second optical amplifying device share the optical amplifying media, the transparent media or the energy suppliers.

In the optical amplifying device of the present invention, it is preferable that to-be-amplified light is pulsed light. In this case, it is preferable that the optical amplifying device of the present invention further includes a pulse stretcher which stretches the pulse duration of the to-be-amplified light to be input into the optical amplifying medium. It is also preferable that the transparent medium extends the pulse width of the to-be-amplified light to be input into the optical amplifying medium. It is preferable that the optical amplifying device of the present invention further includes a pulse compressor which compresses the pulse duration of the to-be-amplified light which is optically amplified and output from the optical amplifying medium. In this case, by stretching the pulse duration of the to-be-amplified light to be input into the optical amplifying medium, damage to optical components of the optical amplifying device can be avoided, and by compressing the pulse duration of the to-be-amplified light which is optically amplified and output from the optical amplifying medium, peak power of pulsed light to be output from the optical amplifying device increases.

It is preferable that the optical amplifying device of the present invention further includes an optical delay system which delays light, and uses light generated by the optical amplifier as to-be-amplified light, delays this to-be-amplified light by the optical delay system, and optically amplifies this delayed to-be-amplified light by the optical amplifier and outputs it.

It is preferable that at least either the optical amplifying medium or the transparent medium is solid. It is preferable that the optical amplifying device of the present invention further includes a temperature stabilizing means for stabilizing the temperature of at least either the optical amplifying medium or the transparent medium.

It is preferable that the energy supplier includes a semiconductor laser element which enables to provide in the form of light the excitation energy that should be supplied to the optical amplifying medium. It is preferable that the optical amplifier further includes an optical path adjusting means for adjusting the optical path of to-be-amplified light. It is preferable that any two or more of a plurality of components including the optical amplifying medium and the transparent medium of the optical amplifier are integrated.

It is preferable that any portion which to-be-amplified light is made incident on or emitted from in the optical amplifying medium or transparent medium is coated with a low-reflection coating. It is also preferable that any portion at which the to-be-amplified light is reflected in the optical amplifying medium or transparent medium is coated with a high-reflection coating.

It is preferable that a light incidence/emission angle at any portion which to-be-amplified light is made incident on or emitted from in the optical amplifying medium or transparent medium is a Brewster angle. Further, it is preferable that the transparent medium totally reflects the to-be-amplified light propagating inside by the wall faces.

It is preferable that the optical amplifying device of the present invention further includes a vacuum vessel which has the optical amplifier and the energy supplier in its internal space, and makes a reduced-pressure atmosphere in the internal space.

Effect of the Invention

The present invention can provide an optical amplifying device which can be easily downsized, increased in output, and stabilized.

Figure 1:
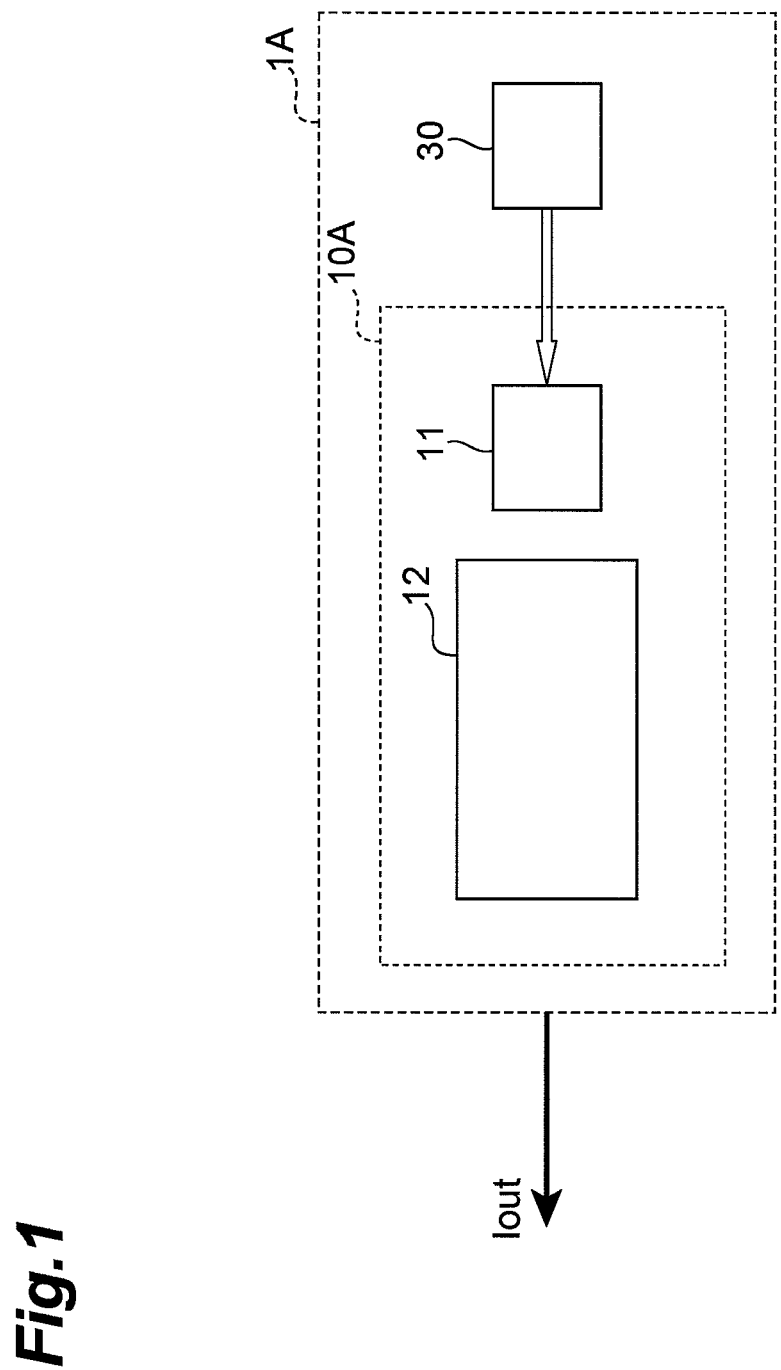
FIG. 1 is a configuration diagram of an optical amplifying device 1A of a first embodiment.

DESCRIPTION OF SYMBOLS 1A-1R: optical amplifying device
10A-10R: optical amplifier
11: optical amplifying medium
12: transparent medium
13: mirror
14: waveplate
15: optical modulator
16: polarization beam splitter
17: Faraday rotator
21: light taking-in means
22: light taking-out means
23: optical delay system
24: optical path adjusting means
30: energy supplier
40: pulse stretcher
50: pulse compressor
51: reflection mirror
52: reflection grating
53: transmission grating
54: dispersing medium
55: prism
60: temperature stabilizing means
61: Peltier element
62: power source
63: radiator
70: temperature stabilizing means
71: Peltier element
72: power source
73: water-cooling radiator
74: circulation pump
75: water tank
80: vacuum vessel

BEST MODES FOR CARRYING OUT THE INVENTION

Hereinafter, best modes for carrying out the present invention will be described in detail with reference to the accompanying drawings. In the description of the drawings, identical or equivalent elements are attached with the same symbol, and overlapping description will be omitted.

FIG. 1 is a configuration diagram of an optical amplifying device 1A of a first embodiment. The optical amplifying device 1A shown in this figure includes an optical amplifier 10A and an energy supplier 30. The optical amplifier 10A includes an optical amplifying medium 11 and a transparent medium 12. The energy supplier 30 supplies excitation energy (for example, excitation light) to the optical amplifying medium 11. The optical amplifying medium 11 is supplied with the excitation light and amplifies and outputs the light. To-be-amplified light passes through the transparent medium 12 in the optical amplifier 10A a plurality of times. The transparent medium 12 can propagate the to-be-amplified light, for example, zigzag inside. The transparent medium 12 is made of, for example, a rigid glass block.

The refractive index of the transparent medium 12 is higher than the refractive index of air, so that by lengthening the distance of propagation of the to-be-amplified light in the transparent medium 12, an optical path length can be lengthened. Therefore, in comparison with the configuration in which to-be-amplified light propagates the same distance in air, the optical amplifying device 1A of the present embodiment can realize the downsizing by the propagation of the to-be-amplified light in the transparent medium 12. From the optical amplifying device 1A, amplified output light $I_{OUT}$ is emitted.

Figure 2:
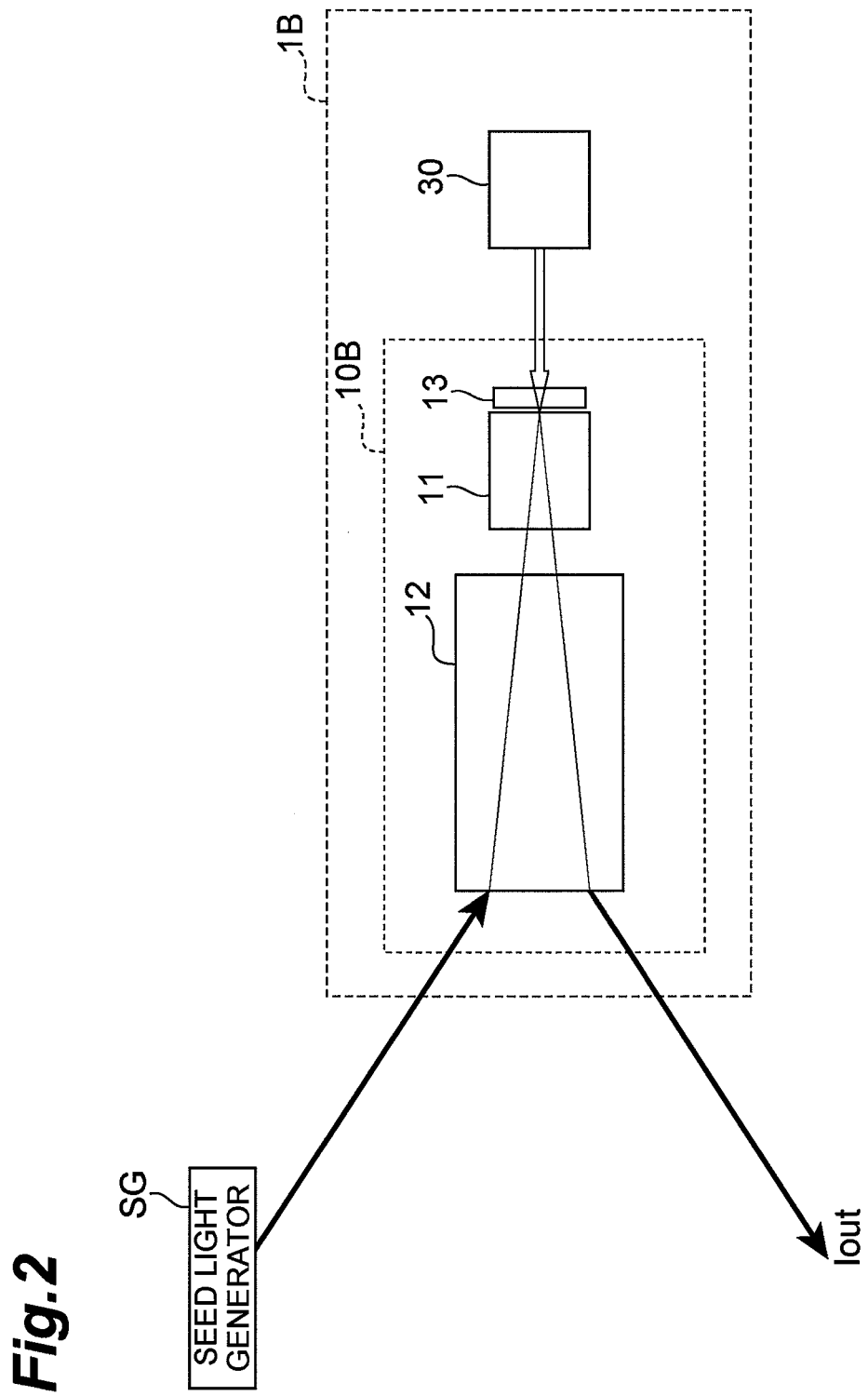
FIG. 2 is a configuration diagram of an optical amplifying device 1B of a second embodiment.

FIG. 2 is a configuration diagram of an optical amplifying device 1B of a second embodiment. The optical amplifying device 1B shown in this figure includes an optical amplifier 10B and an energy supplier 30. The optical amplifier 10B includes the optical amplifying medium 11, transparent medium 12, and a mirror 13. The energy supplier 30 supplies excitation energy (for example, excitation light) to the optical amplifying medium 11. The optical amplifying medium 11 is supplied with the excitation light, and amplifies seed light from an external seed light generator SG and outputs it. The to-be-amplified light passes the transparent medium 12 through in the optical amplifying medium 11 a plurality of times. The mirror 13 passes through excitation light output from the energy supplier 30 and makes it incident on the optical amplifying medium 11, and reflects seed light (to-be-amplified light).

The optical amplifying device 1B of the second embodiment has a multi-pass structure which to-be-amplified light passes through at least twice inside the optical amplifying medium 11 of the optical amplifier 10B. Light made incident on the transparent medium 12 from the seed light generator SG is emitted from the transparent medium 12 without passing through the same optical path inside the transparent medium 12. Thus, in the optical amplifier 10B, the optical path may be constituted by reciprocating not only inside the transparent medium 12 but also inside the optical amplifying medium 11 a plurality of times. In this case, the optical amplifying device 1B is constituted by having a multi-pass amplifying function. From the transparent medium 12 of the optical amplifying device 1B, output light $I_{OUT}$ as seed light amplified by reciprocating inside the optical amplifier 10B is emitted.

Figure 3:
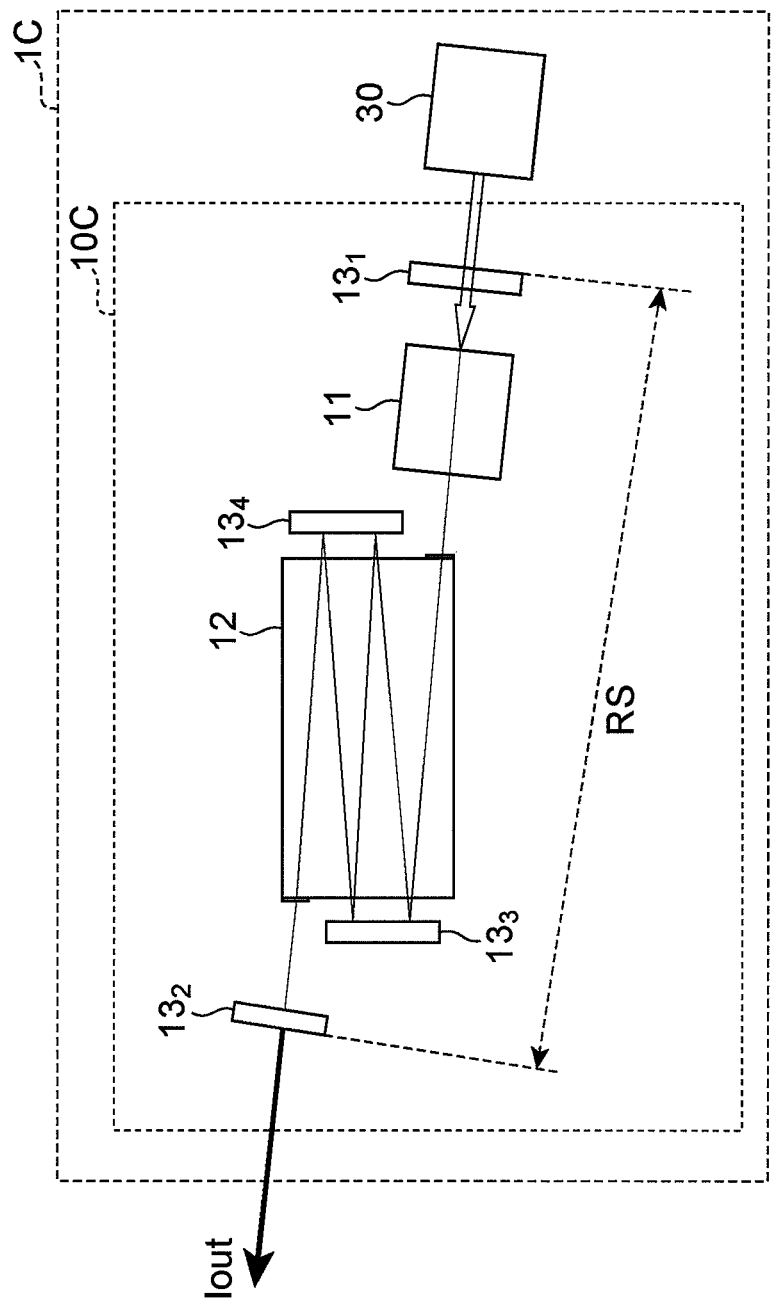
FIG. 3 is a configuration diagram of an optical amplifying device 1C of a third embodiment.

FIG. 3 is a configuration diagram of an optical amplifying device 1C of a third embodiment. The optical amplifying device 1C shown in this figure includes an optical amplifier 10C and an energy supplier 30. The optical amplifier 10C includes the optical amplifying medium 11, the transparent medium 12, and mirrors $13_1$ to $13_4$. The optical amplifier device 1C of this third embodiment is different from that of the first embodiment in that the optical amplifier 10C further includes mirrors $13_1$ to $13_4$. The mirror $13_1$ transmits excitation light output from the energy supplier 30 and makes it incident on the optical amplifying medium 11, and reflects to-be-amplified light. The mirror $13_2$ transmits a part of the to-be-amplified light and reflects the remainder. The mirror $13_1$ and the mirror $13_2$ are mirrors of a Fabry-Perot optical resonator RS, and on a resonant optical path between these mirrors, the amplifying medium 11, the transparent medium 12, and mirrors $13_3$ and $13_4$ are disposed. The mirrors $13_3$ and $13_4$ reflect to-be-amplified light, and are disposed to be opposed to each other across the transparent medium 12, and propagate the to-be-amplified light zigzag inside the transparent medium 12.

Thus, in the third embodiment, due to the structure including the optical resonator, light can be accumulated. In this case, the optical amplifying device 1C is configured so as to have a laser oscillation function capable of generating laser light by causing laser oscillation inside the optical resonator RS. For example, as the optical amplifying medium 11, a gas such as He—Ne, a liquid in which a pigment, etc., is dissolved, or a solid such as Nd:YAG etc., is used, and an optical resonator is added to the optical amplifier 10C including the transparent medium 12, and accordingly, a small-sized laser oscillation device can be realized.

Amplified light is emitted to the outside as an optical output $I_{OUT}$ via the mirror $13_2$. For example, the to-be-amplified light may be made incident on the mirror $13_2$ in a direction opposite to the emitting direction of the optical output $I_{OUT}$. The to-be-amplified light passes through the inside of the transparent medium 12, reaches the inside of the optical amplifying medium 11, and is reflected by the mirror $13_1$, and then passes through the inside of the optical amplifying medium 11 again in an opposite direction, and is then made incident on the inside of the transparent medium 2 again. This incident light propagates in the original optical path in an opposite direction and is reflected by the mirrors $13_3$ and $13_4$, and then reaches the mirror $13_2$. The mirror $13_2$ reflects this light again. During reciprocation inside this resonant path, the to-be-amplified light is amplified, and a part of this is output to the outside via the mirror $13_2$.

Figure 4:
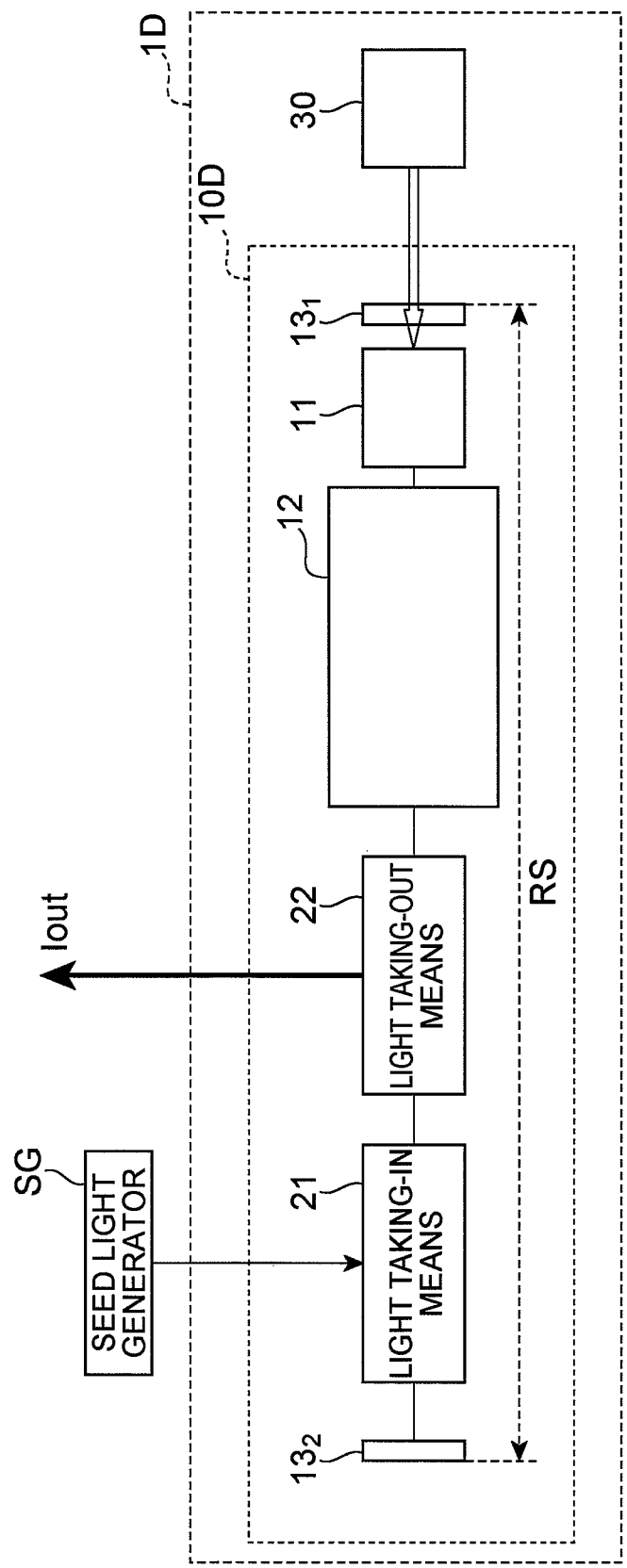
FIG. 4 is a configuration diagram of an optical amplifying device 1D of a fourth embodiment.

FIG. 4 is a configuration diagram of an optical amplifying device 1D of a fourth embodiment. The optical amplifying device 1D shown in this figure includes an optical amplifier 10D and an energy supplier 30. The optical amplifier 10D includes an optical amplifying medium 11, a transparent medium 12, a mirror $13_1$, a mirror $13_2$, a light taking-in means 21, and a light taking-out means 22. The optical amplifying device 1D of this fourth embodiment is different from that of the first embodiment in that the optical amplifier 10D further includes the mirror $13_1$, the mirror $13_2$, the light taking-in means 21, and the light taking-out means 22.

The mirror $13_1$ transmits excitation light from the energy supplier 30 and makes it incident on the optical amplifying medium 11, and reflects to-be-amplified light which was taken-in into the inside of the optical amplifier 10D via the light taking-in means 21 from the seed light generator SG. The mirror $13_2$ reflects the to-be-amplified light. The mirror $13_1$ and the mirror $13_2$ are mirrors of a Fabry-Perot optical resonator RS, and on a resonant optical path between these mirrors, the optical amplifying medium 11, the transparent medium 12, the light taking-in means 21, and the light taking-out means 22 are disposed.

In this fourth embodiment, the light taking-in means 21 takes-in to-be-amplified light from the seed light generator SG outside an optical resonator onto the resonant optical path. The light taking-out means 22 takes-out the to-be-amplified light which was optically amplified inside the optical resonator for a predetermined period to the outside of the optical resonator RS as an optical output $I_{OUT}$. Thus, the optical resonator RS is added to the optical amplifier 10D, and further, from the outside of the optical resonator, seed light which becomes the source of to-be-amplified light is taken into the optical resonator by the light taking-in means 21 and trapped in the optical resonator for a predetermined time, and then taken-out to the outside of the optical resonator by the light taking-out means 22. In this case, the optical amplifying device 1D can generate amplified light which has quality equivalent to that of seed light and high energy, and accordingly, the configuration thereof has a regenerative amplification function for amplifying light. As the seed light generator SG for example, a fiber laser light source can be used.

Figure 5:
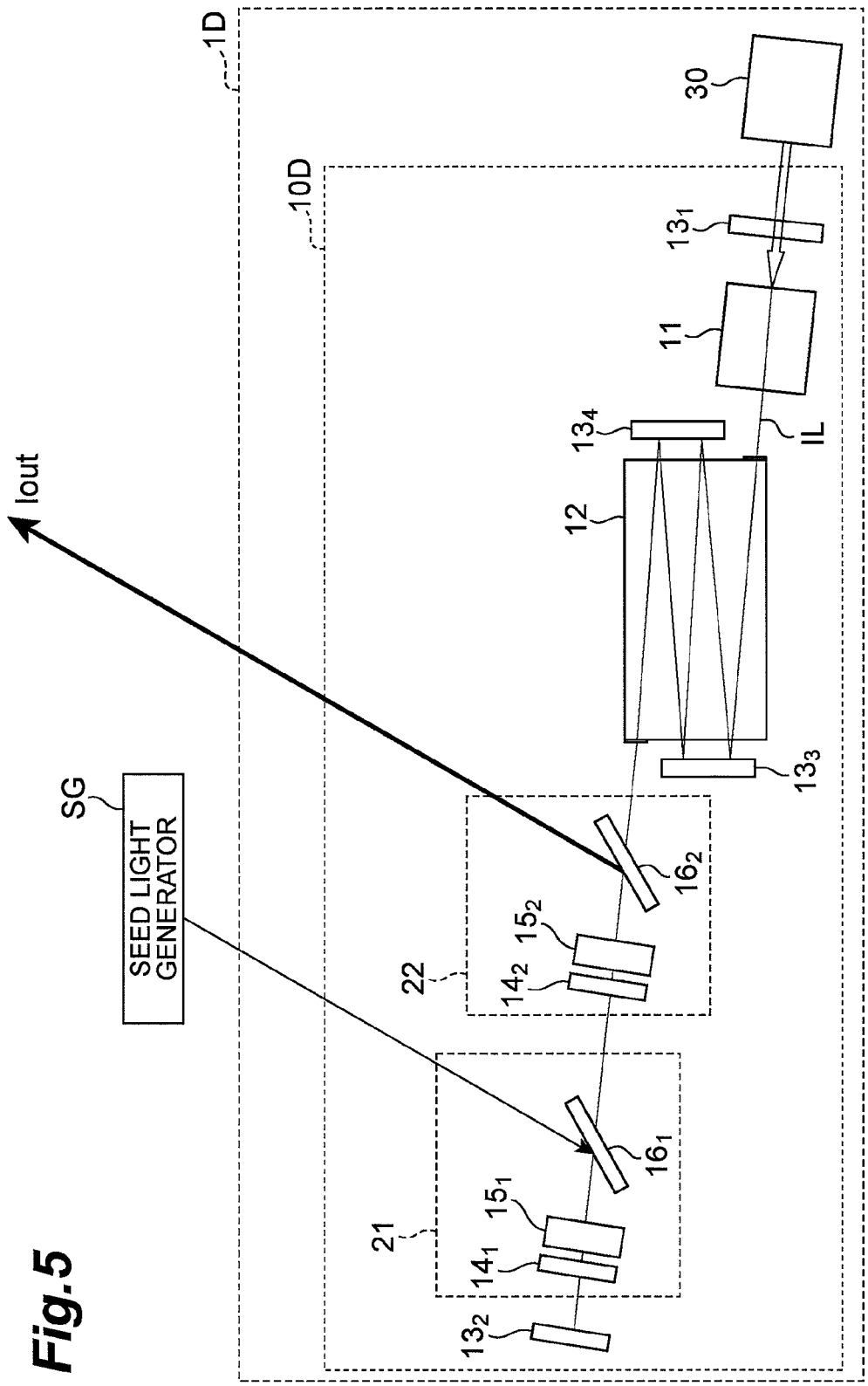
FIG. 5 is a detailed configuration diagram of the optical amplifying device 1D of the fourth embodiment.

FIG. 5 is a detailed configuration diagram of the optical amplifying device 1D of the fourth embodiment. As shown in this figure, the light taking-in means 21 includes a waveplate $14_1$, an optical modulator $15_1$, and a polarization beam splitter $16_1$. The light taking-out means 22 includes a waveplate $14_2$, an optical modulator $15_2$, and a polarization beam splitter $16_2$. The optical modulator $15_1$ and the optical modulator $15_2$, etc., control a deflection state or polarization state of light, and for example, optical crystals having an acousto-optic effect and an electro-optic effect, respectively, can be used.

When a drive signal composed of a predetermined alternating voltage is applied to the optical modulators $15_1$ and $15_2$ consisting of acousto-optic effect elements, due to the diffraction effect of diffraction grating formed inside the elements, the emitting directions of incident light are deflected, and by applying an electric field inside the electro-optic crystals by applying a drive signal composed of a predetermined voltage to optical modulators $15_1$ and $15_2$ consisting of electro-optic effect elements, the polarization direction is changed, and by controlling the polarization direction of light which passes through the electro-optic crystals, transmission/reflection of the beam splitters $16_1$ and $16_2$ disposed in the light propagation paths can be controlled. In other words, these optical modulators can be made to function as optical switches which control the light propagation direction.

For example, when a drive signal is not supplied to the optical modulators $15_1$ and $15_2$ as acousto-optic elements, it is assumed that the advancing direction of light which is about to emit from these matches the orientation of the path of light which reciprocates inside the resonator when resonating. In other words, for example, when a drive signal is applied to the optical modulators $15_1$ and $15_2$, taking-in of seed light into the resonator and taking-out of the output light $I_{OUT}$ are not performed. When a drive signal is applied to the optical modulators $15_1$ and $15_2$, taking-in of seed light into the resonator and taking-out of the output light $I_{OUT}$ are performed. When acousto-optic elements are used, the beam splitter $16_2$ at the rear stage can be a half mirror, and in this case, the half mirror is set out of the resonant path, and light may be deflected so as to irradiate the half mirror at a specific timing.

When it is assumed that light transmits through the polarization beam splitters $16_1$ and $16_2$ in the case where a drive signal is not applied to the optical modulators $15_1$ and $15_2$ as electro-optic elements, light penetrates through the polarization beam splitter $16_1$ when a drive signal is not applied to the optical modulators $15_1$ and $15_2$ and the light is taken into the inside of the resonator, and if a drive signal is applied to the optical modulator $15_1$, the light is reflected by the polarization beam splitter $16_1$ and not taken-in into the resonator. On the other hand, when a drive signal is applied to the optical modulator $15_2$ in a state where light is taken-in into the inside of the resonator, the polarization direction of light which is made incident on the polarization beam splitter $16_1$ rotates and the light is taken-out to the outside. When the polarization beam splitters $16_1$ and $16_2$ have the same structure, a phase difference applied from the waveplate $14_2$ at the rear stage may be adjusted so that light is reflected by the polarization beam splitter $16_2$ when a drive signal is applied to the optical modulator $15_2$.

The resonator consists of an element group between the mirrors $13_1$ and $13_2$. Thus, by controlling the deflection direction or polarization direction, ON/OFF of the light which reciprocates inside the resonator and ON/OFF of the optical output $I_{OUT}$ which is emitted from the resonator via the light taking-out means 22 can be controlled.

The light taking-in means 21 takes-in seed light from the seed light generator SG into the optical resonator at a certain timing by controlling the polarization state or deflection state of light by the optical modulator $15_1$, and thereafter, makes the seed light (to-be-amplified light) reciprocate inside the optical resonator. This optical resonator is configured by the optical path between the mirrors $13_1$ and $13_2$. The light taking-out means 22 takes-out to-be-amplified light to the outside of the optical resonator as an optical output $I_{OUT}$ at a certain timing after elapse of a predetermined time since the light is taken-in by controlling the polarization state or deflection state of the light by the optical modulator $15_2$. When the seed light is pulsed light, to avoid damage to optical components, the seed light may be taken-in after its pulse duration is stretched by making it pass through an appropriate dispersing element.

Figure 6:
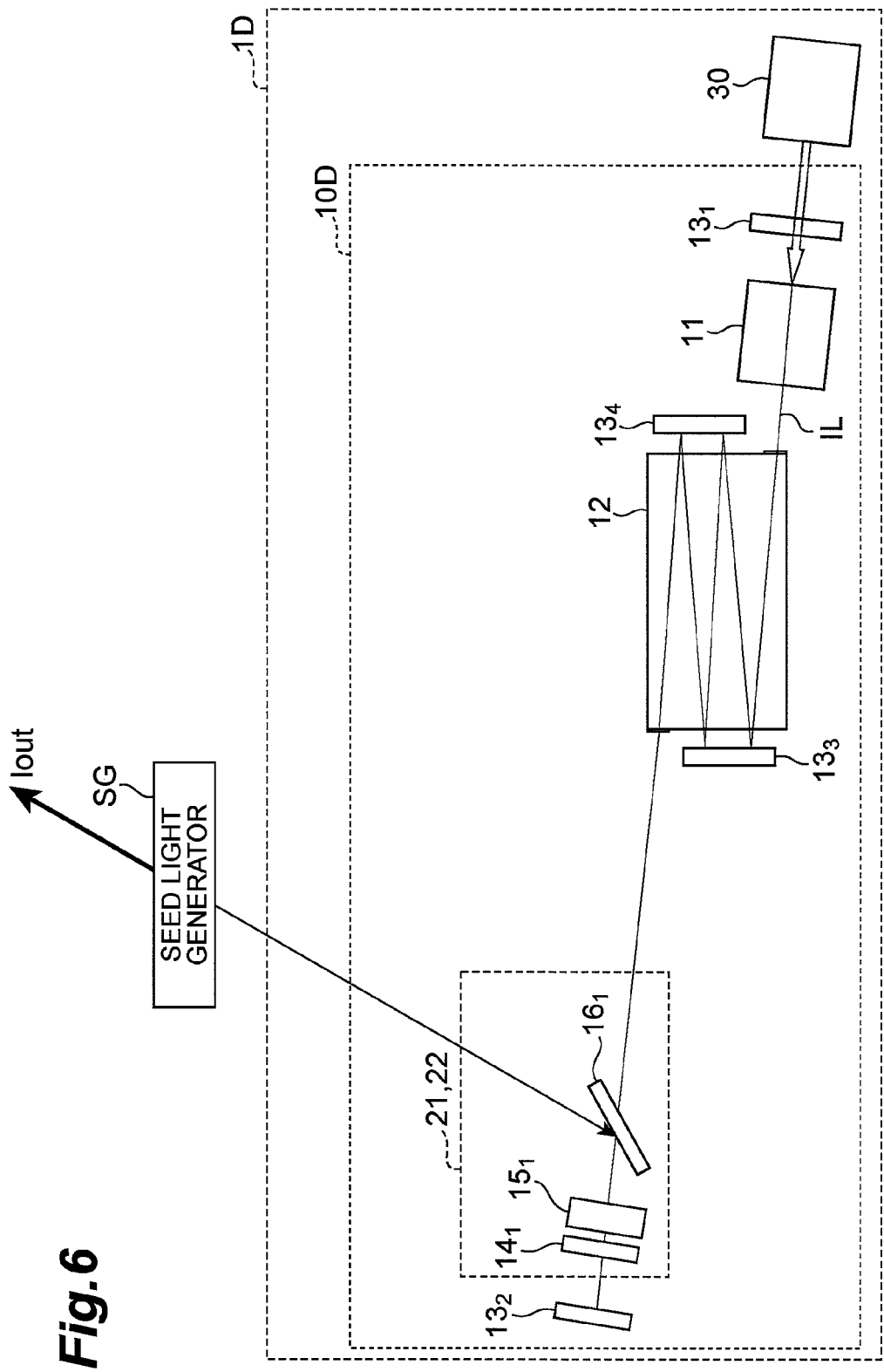
FIG. 6 is a configuration diagram of an exemplary variation of the optical amplifying device 1D of the fourth embodiment.

FIG. 6 is a configuration diagram of an exemplary variation of the optical amplifying device 1D of the fourth embodiment. As shown in this figure, the light taking-in means 21 and the light taking-out means 22 may be common. In other words, the light taking-in means 21 (the waveplate $14_1$, the optical modulator $15_1$, and the polarization beam splitter $16_1$) is used instead of the light taking-out means 22 in FIG. 5 (the waveplate $14_2$, the optical modulator $15_2$, and the polarization beam splitter $16_2$). The functions of the respective means in this case are the same as described above. By turning the optical modulator $15_1$ OFF and applying no drive voltage, S-polarized light made incident on the polarization beam splitter $16_1$ from the seed light generator SG is reflected by the polarization beam splitter $16_1$, transmitted through the optical modulator $15_1$, and made incident on the waveplate $14_1$, subjected to a phase difference of $\lambda/4$, then made incident on the mirror $13_2$. The mirror $13_2$ reflects this light, and the reflected light is further subjected to a phase difference of $\lambda/4$ by the waveplate $14_1$, transmitted through the optical modulator $15_1$, and rotated in polarization direction by 90 degrees finally, and passes through the polarization beam splitter $16_1$ as P-polarized light. The path of the light after being made incident on the transparent medium 12 is as described above. During this, by turning the optical modulator $15_1$ ON and applying a drive voltage, light which returned from the transparent medium 12 is made incident on the polarization beam splitter $16_1$ again, subjected to a phase difference of $\lambda/4$ by the optical modulator $15_1$, subjected to a phase difference of $\lambda/4$ by the waveplate $14_1$, and reaches the mirror $13_2$, and is then reflected by the mirror $13_2$, and subjected to a phase difference of $\lambda/4$ by the waveplate $14_1$ and subjected to a phase difference of $\lambda/4$ by the optical modulator $15_1$, so that it rotates by 180 degrees finally and is trapped inside the resonator as it is P-polarized light. By turning the optical modulator $15_1$ OFF at an appropriate time when the light is sufficiently amplified, polarized light rotates by 90 degrees by being subjected to a phase difference of $\lambda/4$ twice by the waveplate $14_1$, and is reflected as S-polarized light by the polarization beam splitter $16_1$ and emitted to the outside as an optical output $I_{OUT}$.

In other words, a drive signal is applied to the optical modulator $15_1$ and light is taken-in by turning the optical modulator $15_1$ OFF, trapped inside the resonator by turning the optical modulator $15_1$ ON, and taken-out again by turning the optical modulator $15_1$ OFF.

The waveplate $14_1$ may be a ¼ waveplate so that the polarization direction rotates by 90 degrees by two passages. The optical modulator $15_1$ acts similarly to the ¼ waveplate when it is ON, and the optical modulator does not act on the light when it is OFF.

Figure 7:
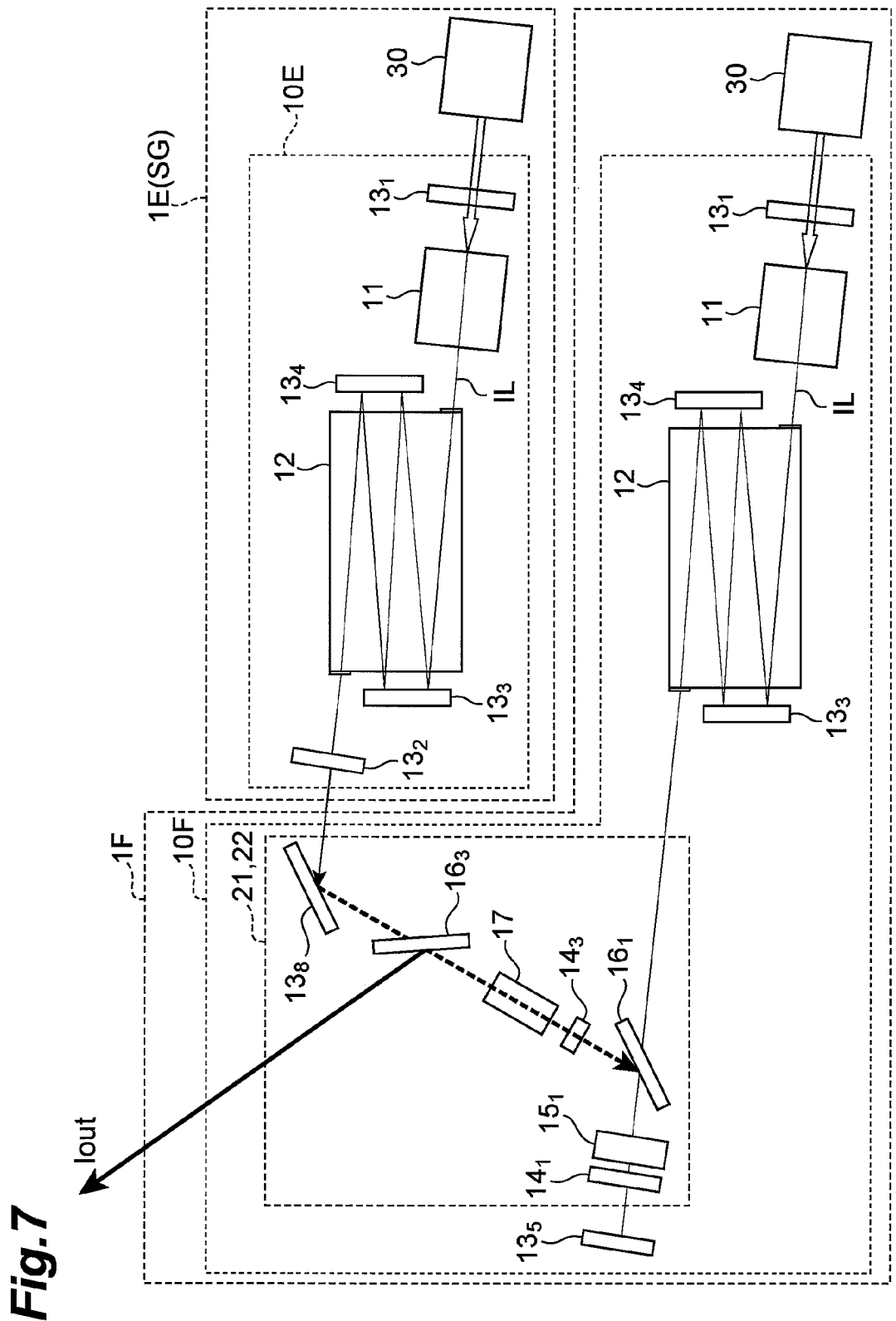
FIG. 7 is a configuration diagram of an optical amplifying device of a fifth embodiment.

FIG. 7 is a configuration diagram of an optical amplifying device of a fifth embodiment. The optical amplifying device shown in this figure includes an optical amplifying device 1E which generates seed light and an optical amplifying device 1F which optically amplifies this seed light and outputs it. The optical amplifying device 1E as a seed light generator constitutes a seed light generator SG, and has the same configuration as that of the optical amplifying device 1C (FIG. 3) of the third embodiment. The optical amplifying device 1F has substantially the same configuration as that of the exemplary variation (FIG. 6) of the optical amplifying device 1D of the fourth embodiment, and has an optical amplifier 10F in which a mirror $13_5$ replaces the mirror $13_2$ of the optical amplifying device 1D of the fourth embodiment, and a mirror $13_8$, a polarization beam splitter $16_3$, a Faraday rotator 17, and a waveplate $14_3$ are arranged in order between the seed light generator SG and the polarization beam splitter $16_1$. In the optical amplifying device 1F, the light taking-in means 21 and the light taking-out means 22 are common.

The light taking-in means 21 (light taking-out means 22) includes the mirror $13_8$, the waveplate $14_3$, the Faraday rotator 17, and the polarization beam splitter $16_3$ in addition to the waveplate $14_1$ the optical modulator $15_1$ and the polarization beam splitter $16_1$. The waveplate $14_1$, the optical modulator $15_1$, and the polarization beam splitter $16_1$ are provided on the resonant optical path of the optical resonator of the optical amplifier 10F. This optical resonator is constituted by the optical path between the mirror $13_5$ and the mirror $13_1$. The waveplate $14_3$, the Faraday rotator 17, and the polarization beam splitter $16_3$ are provided between the mirror $13_8$ and the polarization beam splitter $16_1$. The light taking-in means 21 (light taking-out means 22) takes-in seed light from the optical amplifying device 1E into the optical resonator of the optical amplifying device 1F at a certain timing by controlling the polarization state of the light by the optical modulator $15_1$ and the Faraday rotator 17, and thereafter, makes the seed light (to-be-amplified light) reciprocate inside the optical resonator of the optical amplifying device 1F, and at a timing after elapse of a predetermined time since the light is taken-in, takes-out the to-be-amplified light to the outside of the optical resonator as an optical output $I_{OUT}$.

The optical amplifying device 1C shown in FIG. 3 functions as a seed light generator 1E (SG) in FIG. 7.

Light of the seed light generator 1E (SG) is P-polarized light, and after the light is transmitted through the polarization beam splitter $16_3$, the rotation angle of the polarization face of the Faraday rotator 17 is 45 degrees as viewed in the advancing direction, and a phase difference applied by the waveplate $14_3$ is 45 degrees. Therefore, seed light with polarization rotated by 90 degrees is reflected by the polarization beam splitter $16_1$ and taken-in into the resonator. When taking-out the light, the Faraday rotator 17 applies a rotation angle of −45 degrees in a direction of canceling the phase difference applied by the waveplate $14_3$. Accordingly, the P-polarized light made incident on the polarization beam splitter $16_3$ from the mirror $13_8$ is reflected as S-polarized light by the polarization beam splitter $16_3$ after amplified, and output to the outside as an optical output $I_{OUT}$.

The optical amplifying device 1F may have the same configuration as that of the optical amplifying device 1D (FIG. 4 to FIG. 6) of the fourth embodiment or the same configuration as that of the optical amplifying device 1B (FIG. 2) of the second embodiment, etc., or may have both of these.

The light taking-in means 21 and the light taking-out means 22, respectively, are realized by optical modulators which control light and the optical modulator can be configured by a combination of an optical crystal using an acousto-optic effect or electro-optic effect and an optical element such as a waveplate. When the seed light generated by the seed light generator is pulsed light, to avoid damage to the optical components, the seed light may be taken-in after its pulse duration is stretched. As the light taking-in means 21 and the light taking-out means 22, the same means may be commonly used.

Figure 8:
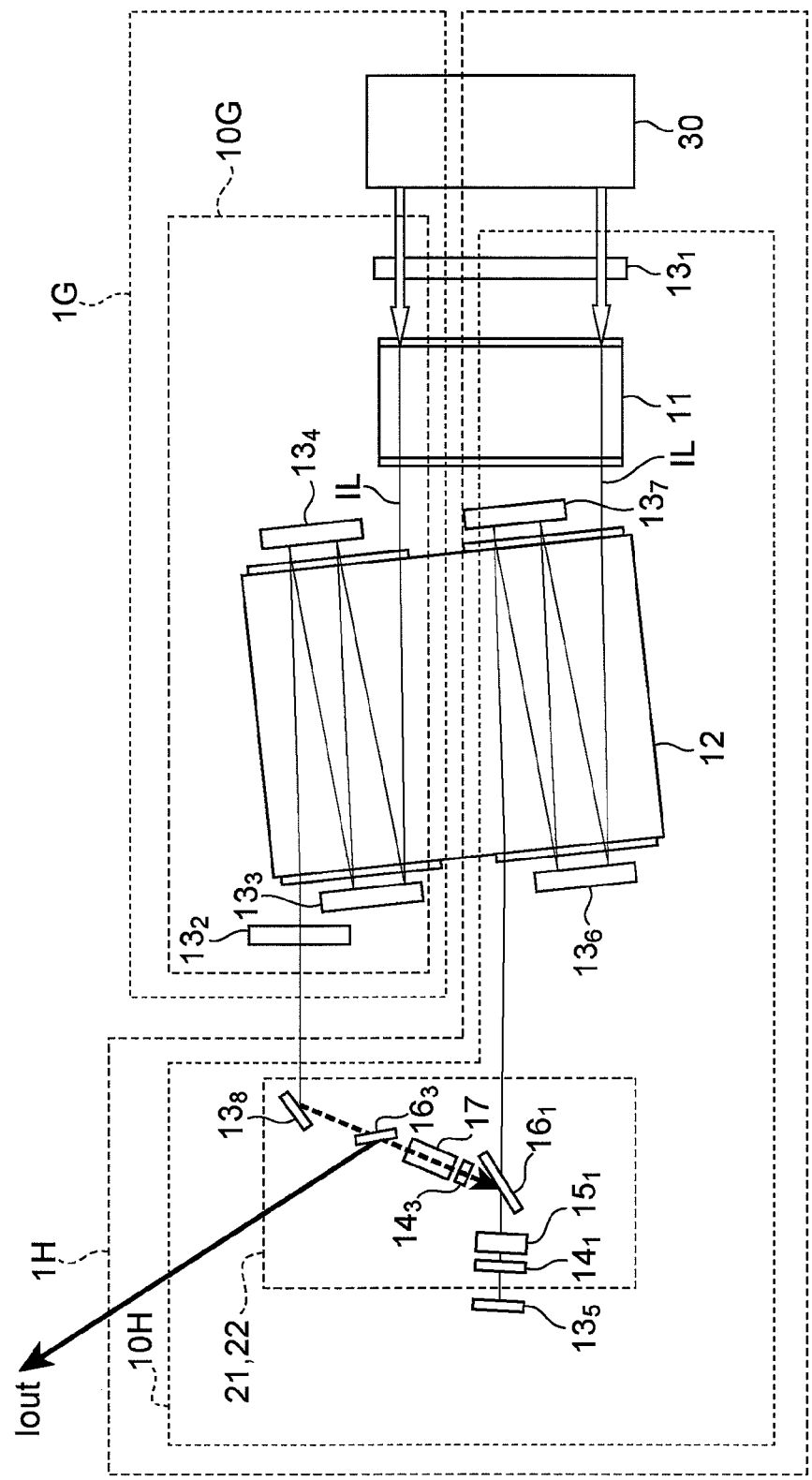
FIG. 8 is a configuration diagram of an optical amplifying device of a sixth embodiment.

FIG. 8 is a configuration diagram of an optical amplifying device of a sixth embodiment. The optical amplifying device shown in this figure includes an optical amplifying device 1G which generates seed light and an optical amplifying device 1H which optically amplifies this seed light and outputs it. The optical amplifying device 1G as a seed light generator has substantially the same configuration as that of the optical amplifying device 1C (FIG. 3) of the third embodiment. The optical amplifying device 1H has substantially the same configuration as that of the exemplary variation (FIG. 6) of the optical amplifying device 1D of the fourth embodiment. In the optical amplifying device 1H, the light taking-in means 21 and the light taking-out means 22 are common. The optical amplifying device 1G and the optical amplifying device 1H share one optical amplifying medium 11, share one transparent medium 12, and share one energy supplier 30.

In the optical amplifier 10G of the optical amplifying device 1G a mirror $13_1$ and a mirror $13_2$ constitute an optical resonator, and on the resonant optical path between these, an optical amplifying medium 11, a transparent medium 12, and mirror $13_3$ and $13_4$ are disposed. The mirrors $13_3$ and $13_4$ reflect to-be-amplified light, and are disposed to be opposed to each other across the transparent medium 12, and propagate the to-be-amplified light zigzag inside the transparent medium 12.

In the optical amplifier 10H of the optical amplifying device 1H, the mirror $13_1$ and the mirror $13_5$ constitute an optical resonator, and on the resonant optical path between these, an optical amplifying medium 11, a transparent medium 12, and mirrors $13_6$ and $13_7$ are arranged. The mirrors $13_6$ and $13_7$ reflect to-be-amplified light, and are disposed to be opposed to each other across the transparent medium 12, and propagate the to-be-amplified light zigzag inside the transparent medium 12.

The light taking-in means 21 (light taking-out means 22) includes a waveplate $14_3$, a Faraday rotator 17, a polarization beam splitter $16_3$, and a mirror $13_8$ in addition to the waveplate $14_1$, the optical modulator $15_1$, and the polarization beam splitter $16_1$. The waveplate $14_1$, the optical modulator $15_1$, and the polarization beam splitter $16_1$ are provided on the resonant optical path of the optical resonator of the optical amplifier 10H. The waveplate $14_3$ and the Faraday rotator 17 are provided between the polarization beam splitter $16_1$ and the polarization beam splitter $16_3$.

The light taking-in means 21 (light taking-out means 22) takes-in seed light from the optical amplifying device 1G into the optical resonator of the optical amplifying device 1H at a certain timing by controlling the polarization state of the light by the optical modulator $15_1$ and the Faraday rotator 17, and thereafter, makes the seed light (to-be-amplified light) reciprocate inside the optical resonator of the optical amplifying device 1H, and at a certain timing after elapse of a predetermined time since the light is taken-in, takes-out the to-be-amplified light to the outside of the optical resonator.

Thus, in the sixth embodiment, the optical amplifying medium 11, the transparent medium 12, or the energy supplier 30 is shared by the optical amplifying device 1G and the optical amplifying device 1H, and accordingly, the number of components can be reduced and downsizing can be realized.

In the first to sixth embodiments described above, the to-be-amplified light may be continuous laser light or pulsed light.

Figure 9:
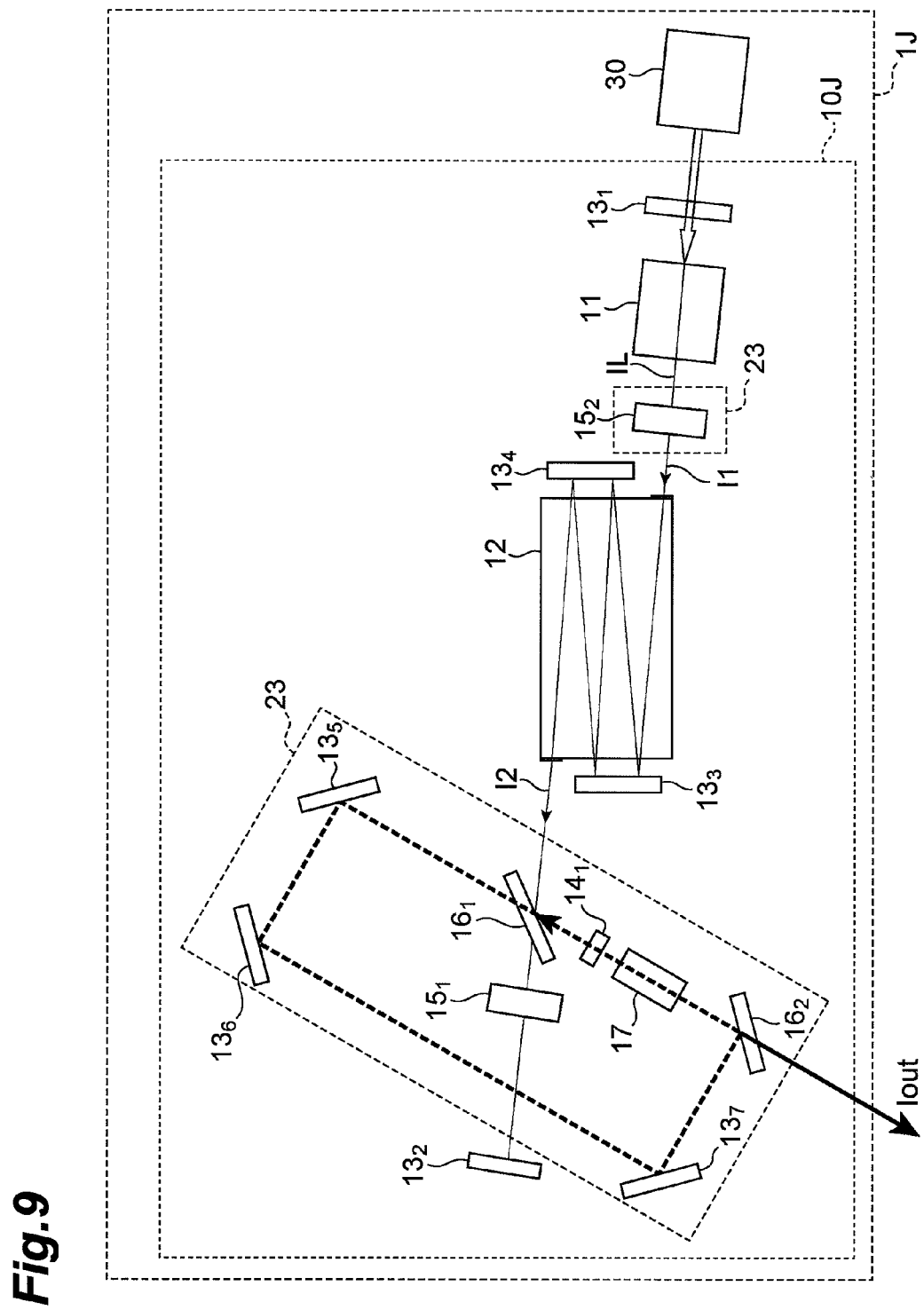
FIG. 9 is a configuration diagram of an optical amplifying device 1J of a seventh embodiment.

FIG. 9 is a configuration diagram of an optical amplifying device 1J of a seventh embodiment. The optical amplifying device 1J shown in this figure includes an optical delay system 23, so that it can generate seed light and optically amplify it. The optical delay system 23 includes mirrors $13_5$ to $13_7$, a waveplate $14_1$, optical modulators $15_1$ and $15_2$, polarization beam splitters $16_1$ and $16_2$, and a Faraday rotator 17. The optical modulator $15_2$ is provided on a resonant optical path between the optical amplifying medium 11 and the transparent medium 12. The optical modulator $15_1$ is provided on a resonant optical path 12 between a transparent medium 12 and the mirror $13_2$. The polarization beam splitter $16_1$ is provided on the resonant optical path 12 between the transparent medium 12 and the optical modulator $15_1$. The polarization beam splitter $16_1$, the mirror $13_5$, the mirror $13_6$, the mirror $13_7$, the polarization beam splitter $16_2$, the Faraday rotator 17, and the waveplate $14_1$ constitutes an optical path in which these are disposed in this order in a ring shape.

In this optical amplifying device 1J, by controlling the polarization state of light by the optical modulator $15_1$, seed light from a Fabry-Perot optical resonator of an optical amplifier 10J is reflected by the polarization beam splitter $16_1$ at a certain timing and taken in and propagated in the ring-shaped optical path of the optical delay system 23. The seed light is then reflected again by the polarization beam splitter $16_1$ and returned to the Fabry-Perot optical resonator of the optical amplifier 10J. The seed light returned to the Fabry-Perot optical resonator of the optical amplifier 10J is trapped in the resonator and optically amplified by controlling the polarization state of the light by the optical modulator $15_2$ disposed on a resonant optical path IL between the optical amplifying medium 11 and the transparent medium 12. Further, at a certain later timing, by controlling the polarization state of the light I1 emitted from the optical modulator $15_2$, to-be-amplified light which was optically amplified by the Fabry-Perot optical resonator of the optical amplifier 10J is reflected by the polarization beam splitter $16_1$ and its polarization direction is rotated by 90 degrees by the waveplate $14_1$ and the Faraday rotator 17, and then the light is made to pass through the polarization beam splitter $16_2$ and output to the outside. Thus, in the seventh embodiment, the optical amplifying device 1J includes the optical delay system 23 so that it can generate seed light and optically amplify the seed light.

Figure 32:
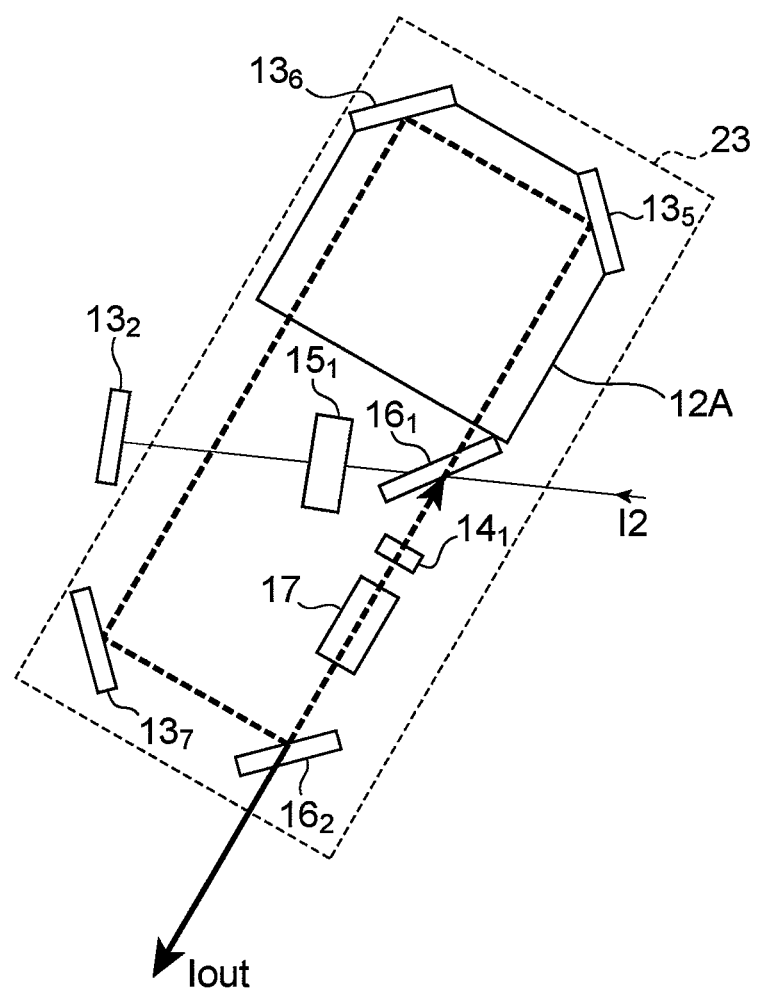
FIG. 32 is a view showing a configuration of an exemplary variation of a delay system 23 in the optical amplifying device 1J of the seventh embodiment.

FIG. 32 shows an embodiment in which a transparent medium 12A is added to the inside of the delay system 23. By using the transparent medium 12A with a refractive index higher than that of air on the optical path 12 of the delay system 23, the optical path length can be lengthened, and the delay time can be lengthened. Here, the light to propagate in the delay system 23 is seed light with a small intensity, so that the transparent medium 12A may be an optical fiber like a polarization maintaining fiber. After passing through a circulating optical path indicated by the dotted line, an optical output $I_{OUT}$ is output from the polarization beam splitter $16_2$.

Figure 33:
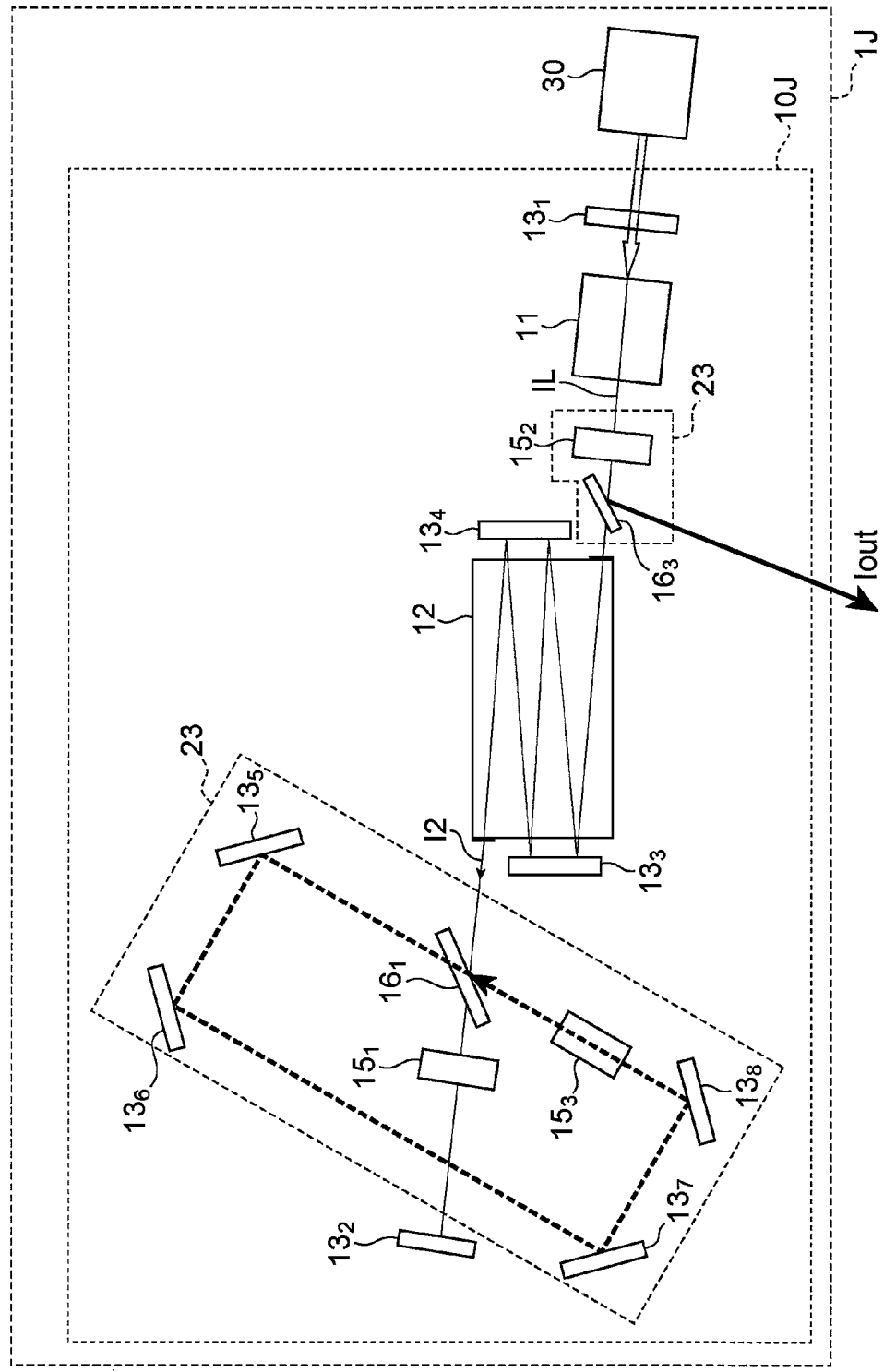
FIG. 33 is a view showing a configuration of another exemplary variation of the delay system 23 in the optical amplifying device 1J of the seventh embodiment.

FIG. 33 shows an embodiment in which, in the configuration of the delay system 23, an optical modulator $15_3$ is added instead of the waveplate $14_1$ and the Faraday rotator 17, a mirror $13_8$ is added instead of the polarization beam splitter $16_2$, and a polarization beam splitter $16_3$ is further added. Seed light from the resonator passes through the optical path 12 and is controlled in the polarization state and taken-in into the delay system 23. Thereafter, the polarization state is rotated by 90 degrees by the optical modulator $15_3$, and accordingly, the seed light repeatedly propagates in the ring-shaped delay system 23 without being reflected by the polarization beam splitter $16_1$. At a certain later timing, by controlling the polarization state of the light by the optical modulator $15_3$, the seed light is reflected by the polarization beam splitter $16_1$, and taken-in into the resonator. The seed light returned to the Fabry-Perot optical resonator of the optical amplifier 10J is controlled in the polarization state of the light by the optical modulator $15_2$, and accordingly trapped in the resonator and optically amplified. Further, at a certain later timing, by controlling the polarization state of the light by the optical modulator $15_2$, the to-be-amplified light in the resonant optical path IL, optically amplified by the Fabry-Perot optical resonator of the optical amplifier 10J, is reflected by the polarization beam splitter $16_3$, and output to the outside. By thus repeatedly propagating the seed light inside the delay system 23, the delay time can be lengthened. In this time, during propagation of the seed light inside the delay system 23, the outputs of the energy supplier when generating seed light and when amplifying light may be controlled to be optimum.

Figure 10:
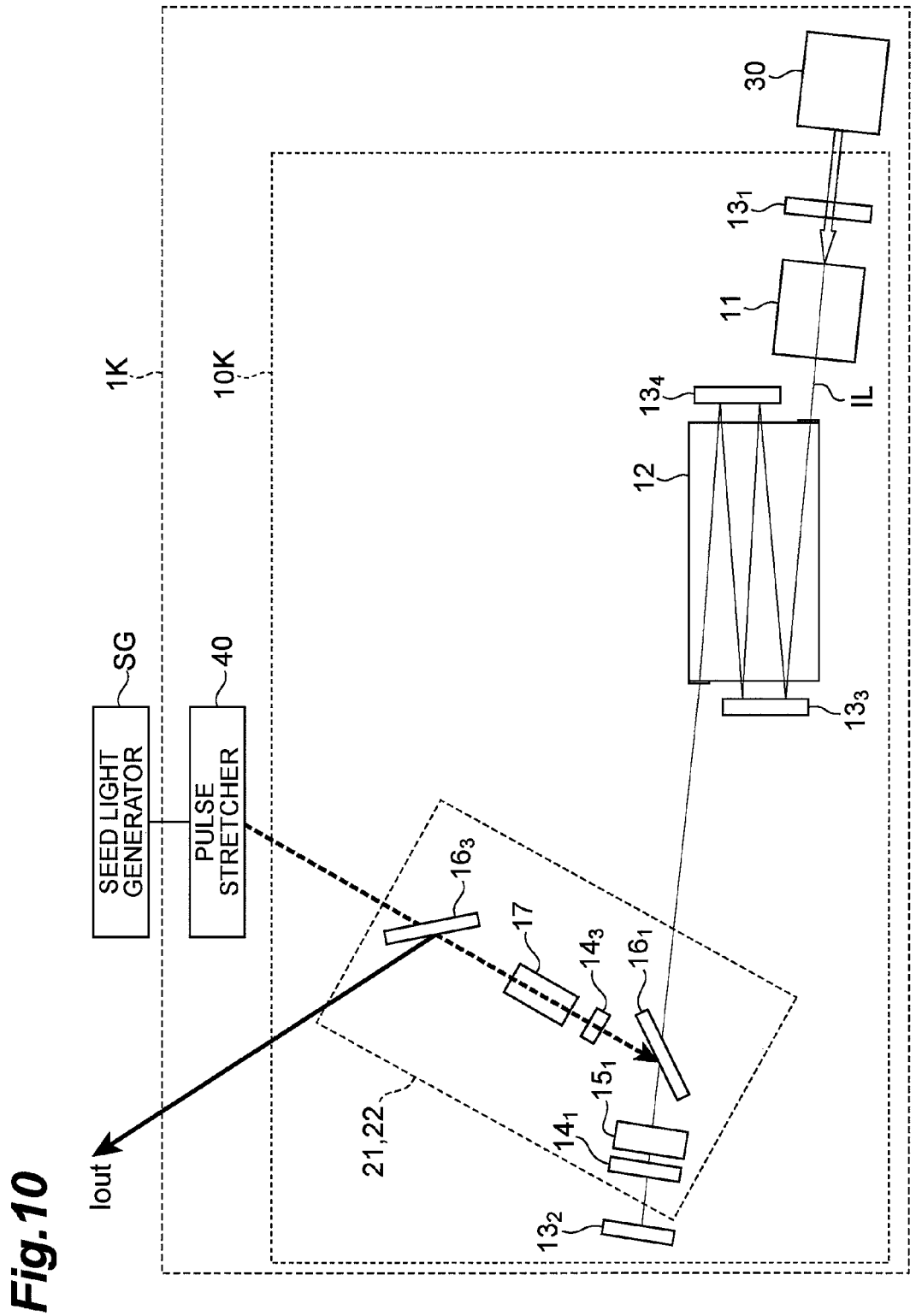
FIG. 10 is a configuration diagram of an optical amplifying device 1K of an eighth embodiment.

FIG. 10 is a configuration diagram of an optical amplifying device 1K of an eighth embodiment. The optical amplifying device 1K shown in this figure includes an optical amplifier 10K, an energy supplier 30, and a pulse stretcher 40. The optical amplifier 10K includes an optical amplifying medium 11, a transparent medium 12, mirrors $13_1$ to $13_4$, and a light taking-in means 21 (commonly serves as a light taking-out means 22). The light taking-in means 21 (light taking-out means 22) includes a waveplate $14_3$, a Faraday rotator 17, and a polarization beam splitter $16_3$ in addition to the waveplate $14_1$, the optical modulator $15_1$ and the polarization beam splitter $16_1$.

The waveplate $14_1$, the optical modulator $15_1$, and the polarization beam splitter $16_1$ are provided on a resonant optical path of an optical resonator of the optical amplifier 10K. The waveplate $14_3$ and the Faraday rotator 17 are provided between the polarization beam splitter $16_1$ and the polarization beam splitter $16_3$. The light taking-in means 21 (light taking-out means 22) takes-in seed light from the pulse stretcher 40 into the optical resonator of the optical amplifying device 1K at a certain timing by controlling the polarization state of the light by the optical modulator $15_1$ and the Faraday rotator 17, and thereafter, makes the seed light (to-be-amplified light) reciprocate inside the optical resonator of the optical amplifying device 1K, at a certain timing after elapse of a predetermined time since the light is taken-in, takes-out the to-be-amplified light to the outside of the optical resonator.

The pulse stretcher 40 extends the pulse duration of seed light (pulsed light) from the seed light generator and inputs the stretched seed light into the optical resonator of the optical amplifier 10K. To suppress damage to the optical components due to high-intensity pulsed light, seed light extended temporally by the pulse stretcher 40 is taken-in into the optical amplifier 10K. For example, as the pulse stretcher 40, a dispersing medium such as an optical fiber is used, and a wavelength dispersing element such as a diffraction grating or a prism is also used. Herein, when a dispersing medium is used as the transparent medium 12, this transparent medium 12 has the same function as that of the pulse stretcher, so that there is no need to provide the pulse stretcher 40 separately.

Figure 11:
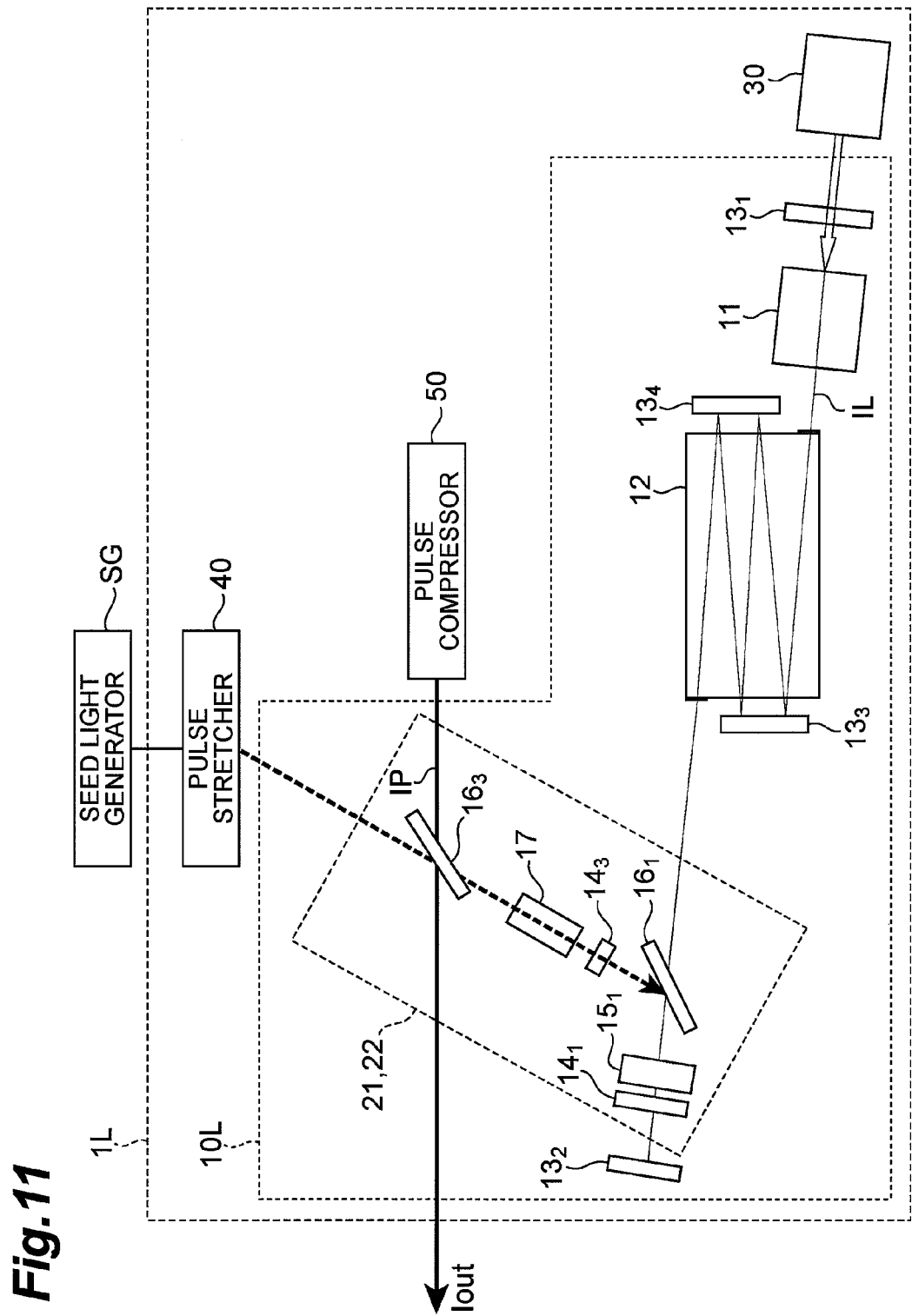
FIG. 11 is a configuration diagram of an optical amplifying device 1L of a ninth embodiment.

FIG. 11 is a configuration diagram of an optical amplifying device 1L of a ninth embodiment. The optical amplifying device 1L of the ninth embodiment shown in this figure is different from the configuration (FIG. 10) of the eighth embodiment in that the optical amplifying device 1L further includes a pulse compressor 50. The pulse width compressor 50 compresses the pulse duration of to-be-amplified light (pulsed light) IP which is optically amplified and output from the optical amplifier 10L, and outputs the compressed pulsed light.

In this optical amplifying device 1L, seed light (pulsed light) from the seed light generator SG is extended in pulse duration by the pulse stretcher 40, and then input into the optical resonator of the optical amplifier 10L by the light taking-in means 21. Then, the pulsed light IP optically amplified by the optical resonator of the optical amplifier 10L is taken-out by the light taking-out means 22, and then com- pressed in pulse duration by the pulse compressor 50 and output. The pulsed light output from this optical amplifying device 1L has a higher peak power. FIG. 12 to FIG. 15 are views showing configuration examples of the pulse compressor 50, respectively.

Figure 12:
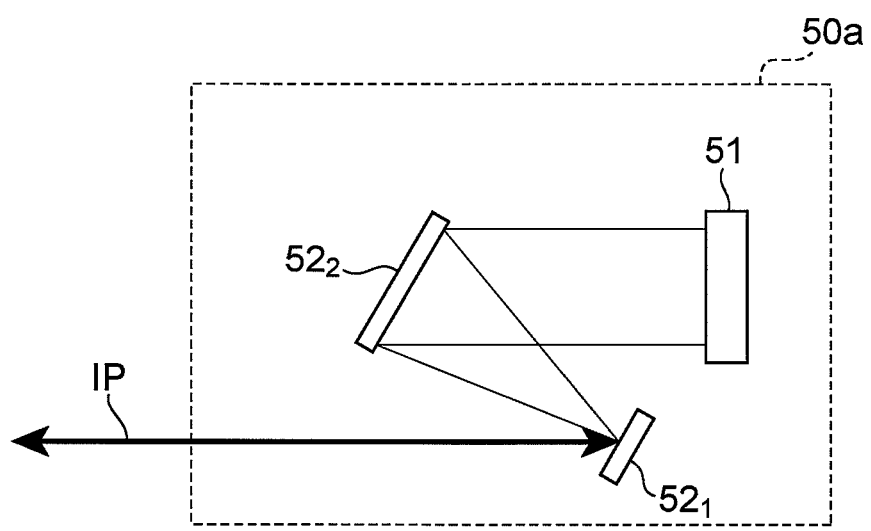
FIG. 12 is a view showing a configuration example of a pulse compressor 50.

The pulse compressor 50a shown in FIG. 12 includes a reflection mirror 51 and reflection gratings $52_1$ and $52_2$. The reflection mirror 51 is formed by combining two plane mirrors so that their reflecting faces are at 90 degrees from each other, and after one plane mirror reflects incident light IP, the other plane mirror can reflect and output it. Light to be made incident on and light to be emitted from this reflection mirror 51, respectively, have optical paths which are different from each other although they are parallel to each other. Light IP input into this pulse compressor 50a is dispersed by the reflection grating $52_1$, and respective wavelength components are made parallel to each other by the reflection grating $52_2$, the optical path thereof is reflected by the reflection mirror 51, the respective wavelength components are condensed to the reflection grating $52_1$ by the reflection grating $52_2$, and multiplexed by the reflection grating $52_1$ and output. By using the pulse compressor 50a thus configured, negative group velocity dispersion can be effectively applied to the pulsed light.

Figure 13:
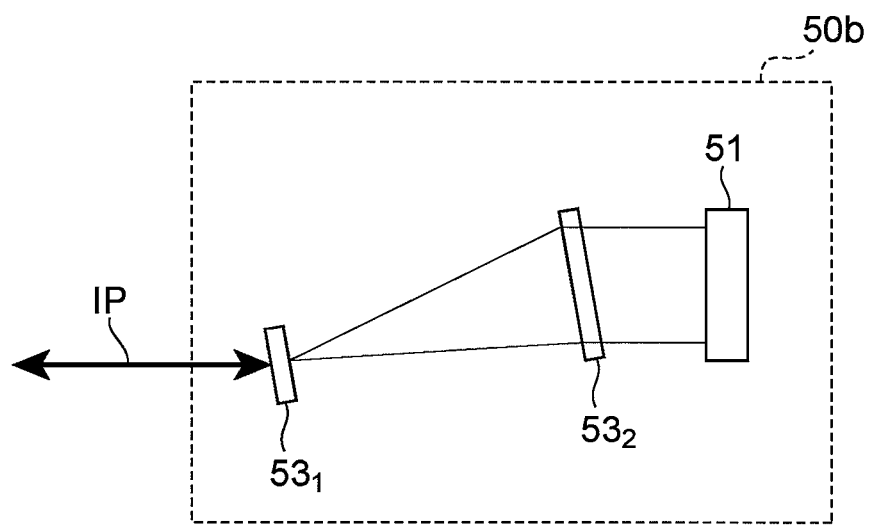
FIG. 13 is a view showing a configuration example of the pulse compressor 50.

The pulse compressor 50b shown in FIG. 13 includes a reflection mirror 51 and transmission gratings $53_1$ and $53_2$. Light IP input into this pulse compressor 50b is dispersed by the transmission grating $53_1$, respective wavelength components are made parallel to each other by the transmission grating $53_2$, the optical path thereof is reflected by the reflection mirror 51, and the respective wavelength components are condensed to the transmission grating $53_1$ by the transmission grating $53_2$ and multiplexed by the transmission grating $53_1$ and output. By using the pulse compressor 50b thus configured, negative group velocity dispersion can be effectively applied to the pulsed light. In the pulse compressor 50b, the transmission gratings are used, so that high-reflection coating such as gold on the surface of the reflection grating is not required.

Figure 14:
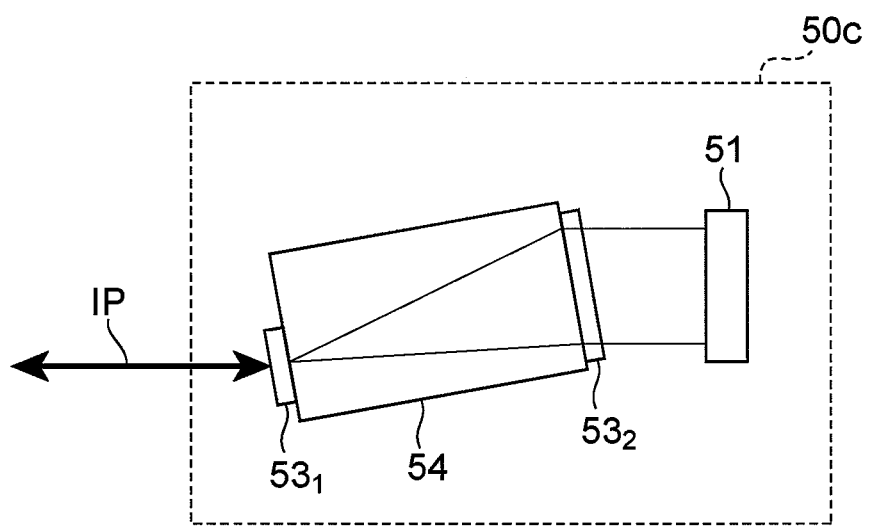
FIG. 14 is a view showing a configuration example of the pulse compressor 50.

The pulse compressor 50c shown in FIG. 14 includes a reflection mirror 51, transmission gratings $53_1$ and $53_2$, and a dispersing medium 54. This pulse compressor 50c is structured by providing the above-described pulse compressor 50b with the dispersing medium 54 between the transmission grating $53_1$ and the transmission grating $53_2$, and except for this, the structure is the same as that of the pulse compressor 50b. Accordingly, the pulse compressor 50c can be downsized.

Figure 15:
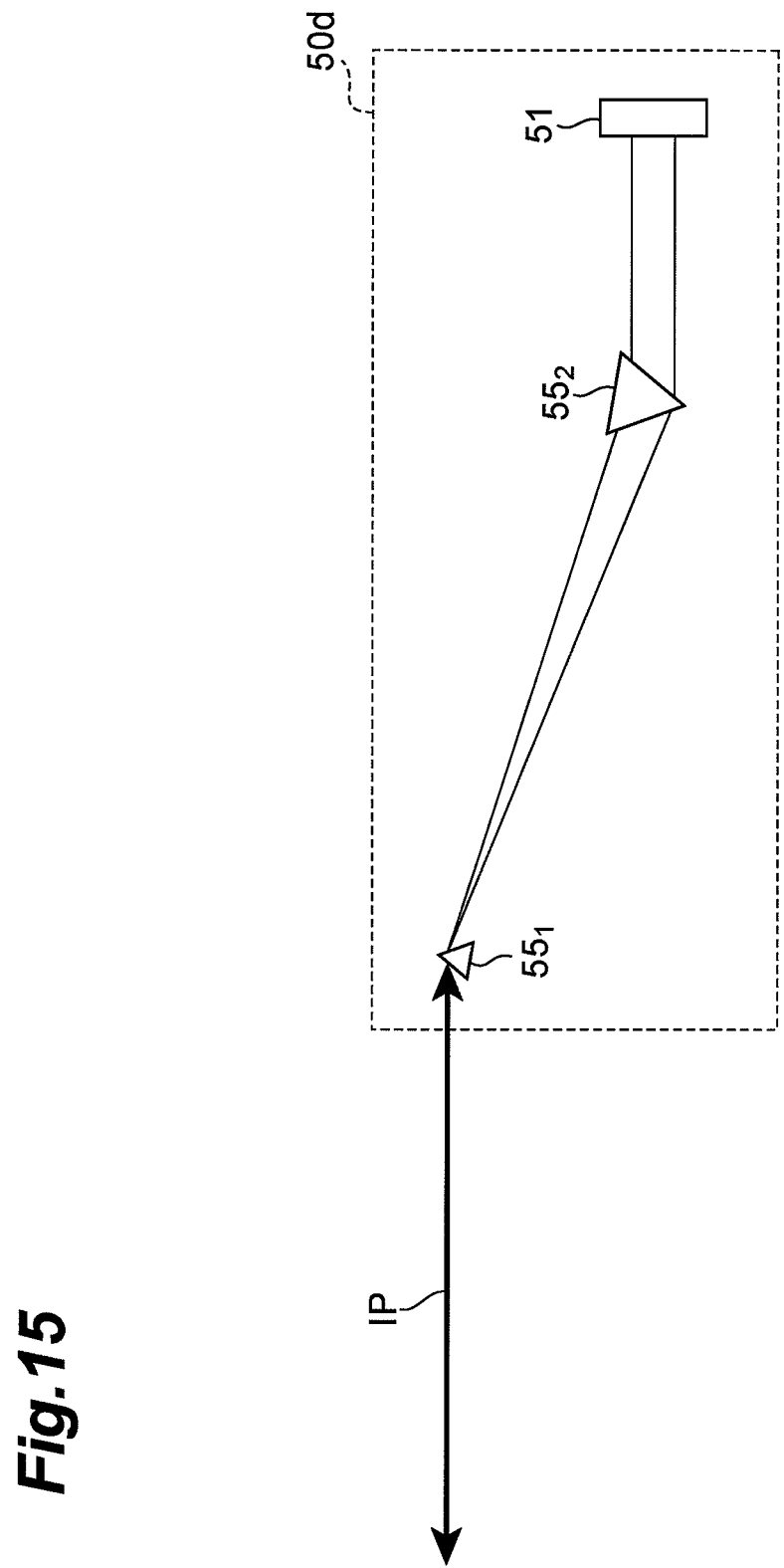
FIG. 15 is a view showing a configuration example of the pulse compressor 50.

The pulse compressor 50d shown in FIG. 15 includes a reflection mirror 51 and prisms $55_1$ and $55_2$. Light IP input into this pulse compressor 50d is dispersed by the prism $55_1$, wavelength components are made parallel to each other by the prism $55_2$, the optical path is reflected by the reflection mirror 51, and the respective wavelength components are condensed to the prism $55_1$ by the prism $55_2$ and multiplexed by the prism $55_1$ and output. By using the pulse compressor 50d thus configured, negative group velocity dispersion can be effectively applied to the pulsed light.

In the above-described ninth embodiment, an optical element having an optical modulating function may be used instead of the reflection mirror 51. For example, a liquid crystal spatial optical modulator or a deformable mirror etc., may be used. In this case, temporal characteristics and wavefront of output pulsed light can be controlled. It is also allowed that a structure which does not use the reflection mirror but includes four diffraction gratings or prisms is used.

It is also allowed that a prism which is a dispersion element including a combination of a prism and a grating is used in the pulse compressor.

In the configurations of the first to ninth embodiments described above, as the optical amplifying medium of the optical amplifier, a solid laser medium may be used. For example, titanium sapphire, Nd: YAG, Yb: KGW, and Yb: KYW, etc., can be used. As the transparent medium 12, for example, a solid medium such as synthetic silica can be used. Synthetic silica has high transparency in a broad waveband from the ultraviolet region to the infrared region, and in addition, has a small thermal expansion coefficient, so that it is excellent in thermal stability. In addition, the transparent medium 12 may be other glass materials such as borosilicate glass and lime glass, plastic materials such as acryl and polypropylene, single crystal materials such as sapphire and diamond, or a large-diameter optical fiber such as a POF (Plastic Optical Fiber).

Figure 16:
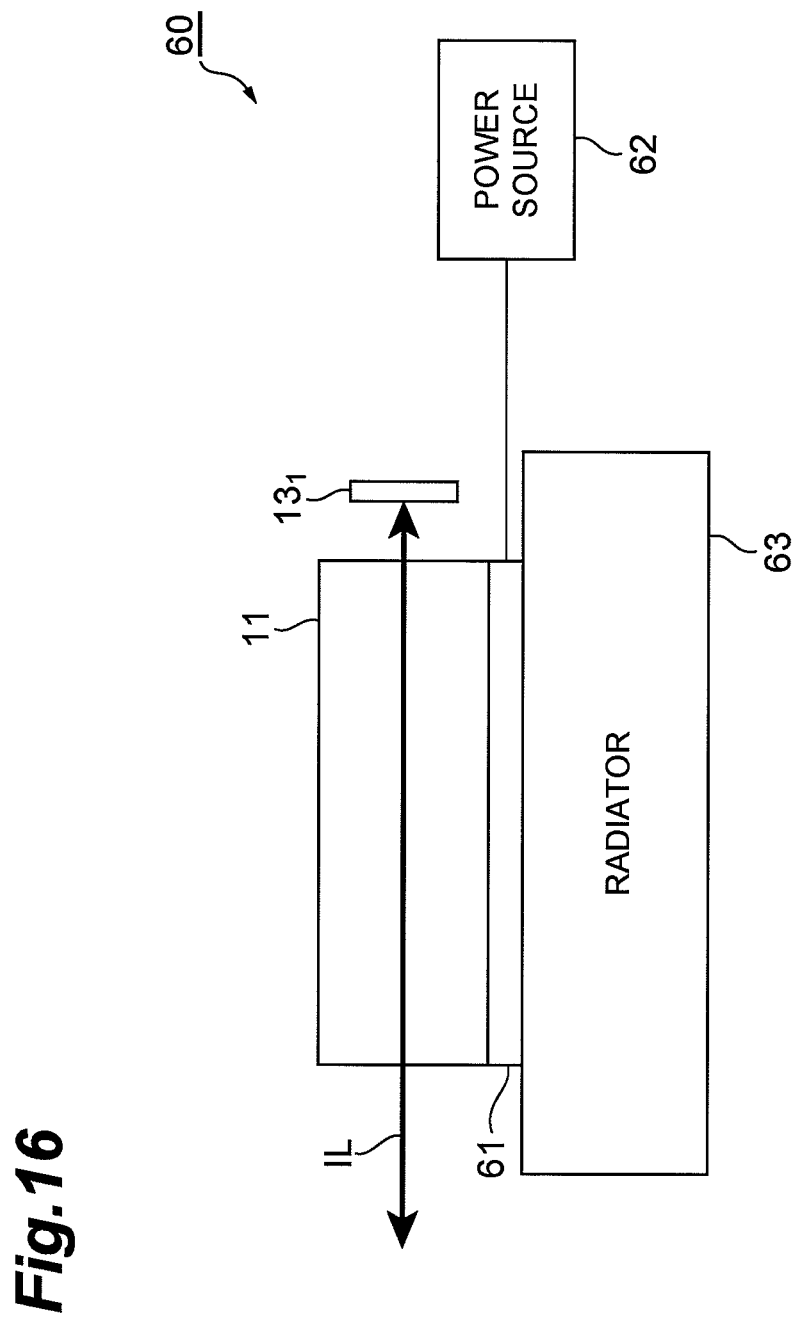
FIG. 16 is a partial configuration diagram of an optical amplifying device of a tenth embodiment.

FIG. 16 is a partial configuration diagram of an optical amplifying device of a tenth embodiment. This figure shows an optical amplifying medium 11 and a temperature stabilizing means 60 for stabilizing the temperature of the optical amplifying medium 11, included in the optical amplifier. On the optical path IL, the optical amplifying medium 11 is disposed. Configurations of other portions are the same as in the first to ninth embodiments. The temperature stabilizing means 60 includes a Peltier element 61 provided in contact with the optical amplifying medium 11, a power source 62 which supplies electric power to the Peltier element 61, and a radiator 63 provided in contact with the Peltier element 61. Provision of the temperature stabilizing means 60 for maintaining the temperature of the optical amplifying medium 11 at a fixed temperature is effective for radiation of heat generated inside the optical amplifying medium 11, etc., so that the operation can be stabilized. Alternatively, the temperature stabilizing means 60 may be a water-cooling radiation device, a heating device which applies heat uniformly, or an ultrasonic device which stabilizes the operation by using ultrasonic.

Figure 17:
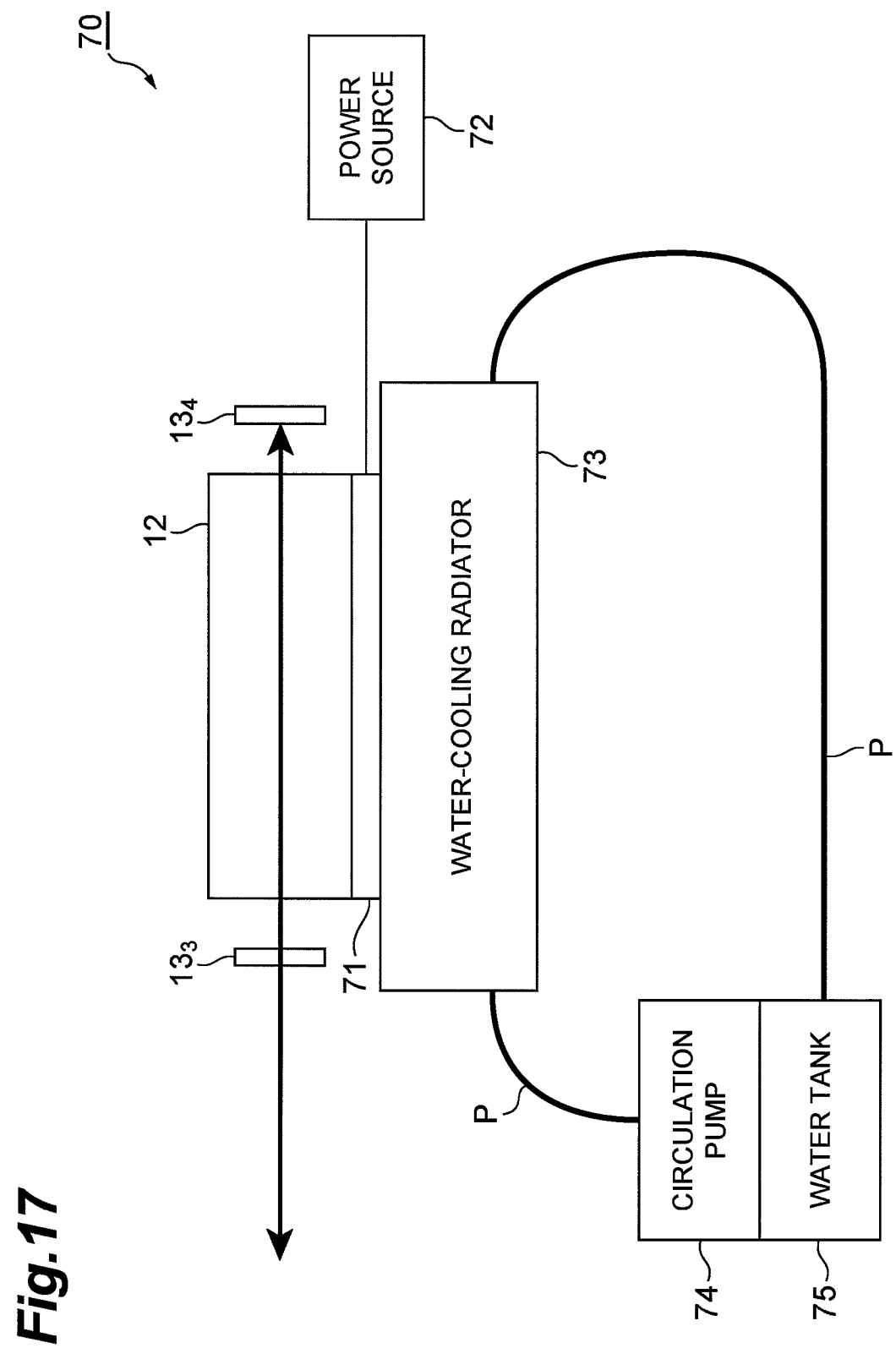
FIG. 17 is a partial configuration diagram of an optical amplifying device of an eleventh embodiment.

FIG. 17 is a partial configuration diagram of an optical amplifying device of an eleventh embodiment. This figure shows a transparent medium 12 and a temperature stabilizing means 70 for stabilizing the temperature of this transparent medium 12, included in the optical amplifier. On the optical path IL, mirrors $13_3$ and $13_4$ and an optical amplifying medium 12 are disposed. Configurations of other portions are the same as in the first to tenth embodiments. The temperature stabilizing means 70 includes a Peltier element 71 provided in contact with the transparent medium 12, a power source 72 which supplies electric power to this Peltier element 71, a water-cooling radiator 73 provided in contact with the Peltier element 71, a circulation pump 74 for supplying cooling water to the water-cooling radiator 73 via a water channel P, and a water tank 75 to which cooling water discharged from the water-cooling radiator 73 returns via the water channel P.

By providing the temperature stabilizing means 70 which maintains the temperature of the transparent medium 12 at a fixed temperature, a more stable operation can be realized. For example, when the transparent medium 12 is synthetic silica, the thermal expansion coefficient thereof is approximately $5.5 \times 10^{-7}/°$ C., so that by making the temperature changes of the transparent medium 12 fall within 1° C., expansion of the transparent medium 12 can be suppressed in wavelength order level. Alternatively, the temperature stabilizing means 70 may be a heating device which applies heat uniformly or an ultrasonic device which stabilizes the operation by using ultrasonic.

In the configurations of the first to eleventh embodiments, a semiconductor laser light source can be used as the energy supplier 30. Herein, as the energy supplier 30, by using a semiconductor laser light source having an oscillation wavelength matching the absorption spectrum of the optical amplifying medium 11, the excitation efficiency of the optical amplifying medium 11 can be improved. When the optical amplifying medium 11 is a solid laser medium, for example, the absorption wavelength of a Yb laser medium has excellent consistency with the oscillation wavelength of a commercially available semiconductor laser light source. In this case, excitation energy is supplied to the optical amplifying medium 11 by laser light, so that a dichroic mirror which transmits light of the semiconductor laser light source but reflects the to-be-amplified light is preferably used as the mirror $13_1$.

Figure 18:
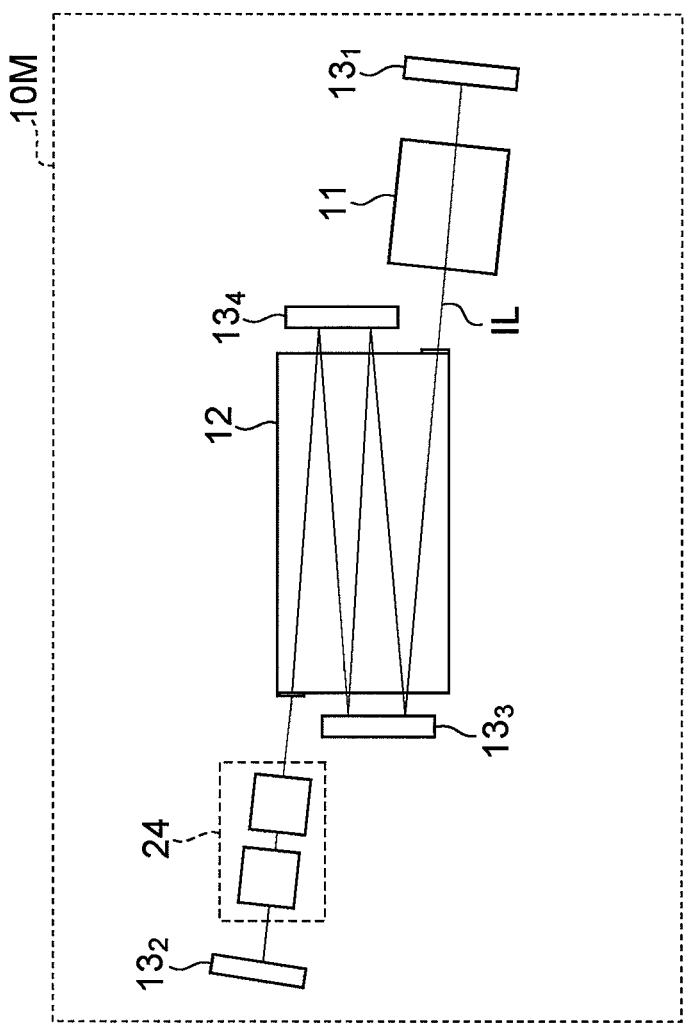
FIG. 18 is a configuration diagram of an optical amplifier 10M of an optical amplifying device of a twelfth embodiment.

FIG. 18 is a configuration diagram of the optical amplifier 10M of an optical amplifying device of a twelfth embodiment. In this figure, illustration of the energy supplier is omitted, however, in the same manner as in the above-described embodiments, it introduces excitation light into the optical path IL from an appropriate position, for example, the back side of the mirror $13_1$. The optical amplifier 10M shown in this figure also includes an optical path adjusting means 24 in addition to the optical amplifying medium 11, the transparent medium 12, and the mirrors $13_1$ to $13_4$. The optical path adjusting means 24 adjusts and corrects the length of the optical path IL of to-be-amplified light in the optical resonator between the mirror $13_1$ and the mirror $13_2$. The optical path adjusting means 24 can be realized by using, for example, an optical modulating element, a piezo element, and an automatic mirror drive mechanism, etc. When the optical path adjusting means 24 uses an optical modulating element, for example, KTN crystal having an electro-optic effect is effectively used. By orthogonally disposing the crystal axes of the KTN crystal, light can be adjusted biaxially independently.

Figure 19:
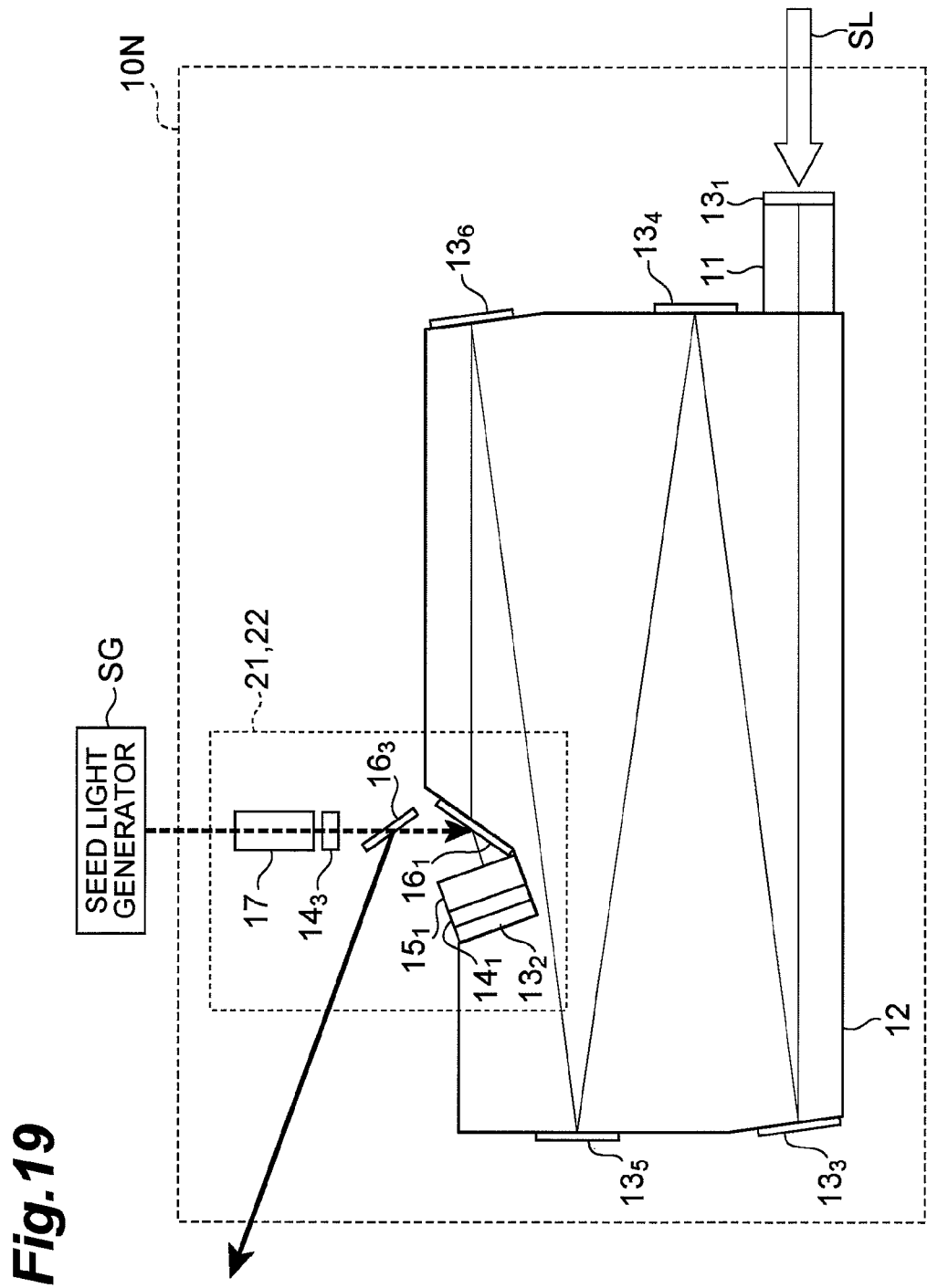
FIG. 19 is a configuration diagram of an optical amplifier 10N of an optical amplifying device of a thirteenth embodiment.

FIG. 19 is a configuration diagram of an optical amplifier 10N of an optical amplifying device of a thirteenth embodiment. In this figure, the illustration of the energy supplier is also omitted, however, it introduces excitation light into the optical amplifying medium 11 from an appropriate position. Semiconductor laser light SL as excitation light is made incident on the inside of the optical amplifying medium 11 disposed in a resonant optical path via the mirror $13_1$. The mirror $13_1$ is a half mirror. In the optical amplifier 10N shown in this figure, the optical amplifying medium 11, the transparent medium 12, the mirrors $13_1$ to $13_6$ constituting an optical resonator, and a part of the light taking-in means 21 (commonly serves as the light taking-out means 22) are optically joined and integrated.

The light taking-in means 21 (light taking-out means 22) includes a waveplate $14_1$, an optical modulator $15_1$, a polarization beam splitter $16_1$, a polarization beam splitter $16_3$, a waveplate $14_3$, and a Faraday rotator 17. The waveplate $14_1$, the optical modulator $15_1$, and the polarization beam splitter $16_1$ are provided on the resonant optical path of the optical resonator of the optical amplifier 10N. The polarization beam splitter $16_3$, the waveplate $14_3$, and the Faraday rotator 17 are provided between the seed light generator SG and the polarization beam splitter $16_1$.

The mirror $13_2$, the waveplate $14_1$, the optical modulator $15_1$, and the polarization beam splitter $16_1$ are provided in a groove of the transparent medium 12. Among these, the mirror $13_2$, the waveplate $14_1$, and the optical modulator $15_1$ are fixed to one side wall of the groove of the transparent medium 12, and the polarization beam splitter $16_1$ is fixed to the other side wall of the groove of the transparent medium 12. The mirrors 13₃ to 13₆ are fixed to the wall faces of the transparent medium 12.

The mirror 13₃ reflects light between the optical amplifying medium 11 and the mirror 13₄. The mirror 13₄ reflects light between the mirror 13₃ and the mirror 13₅. The mirror 13₅ reflects light between the mirror 13₄ and the mirror 13₆. The mirror 13₆ reflects light between the mirror 13₅ and the polarization beam splitter 16₁. These mirrors 13₃ to 13₆ are fixed to the wall faces of the transparent medium 12 so that an optical path of the to-be-amplified light is set inside the transparent medium 12 as described above. More specifically, portions to which the mirrors 13₃ to 13₆ are fixed of the wall faces of the transparent medium 12 slope as appropriate.

To integrate the respective components, an optical adhesive may be used or the optical contact technique may be used. According to the optical contact technique, without using an adhesive sufficient joining is realized by optically polishing and attaching the respective components to each other. By integrating the respective components, a device can be obtained that realizes downsizing and stabilization.

Figure 20:
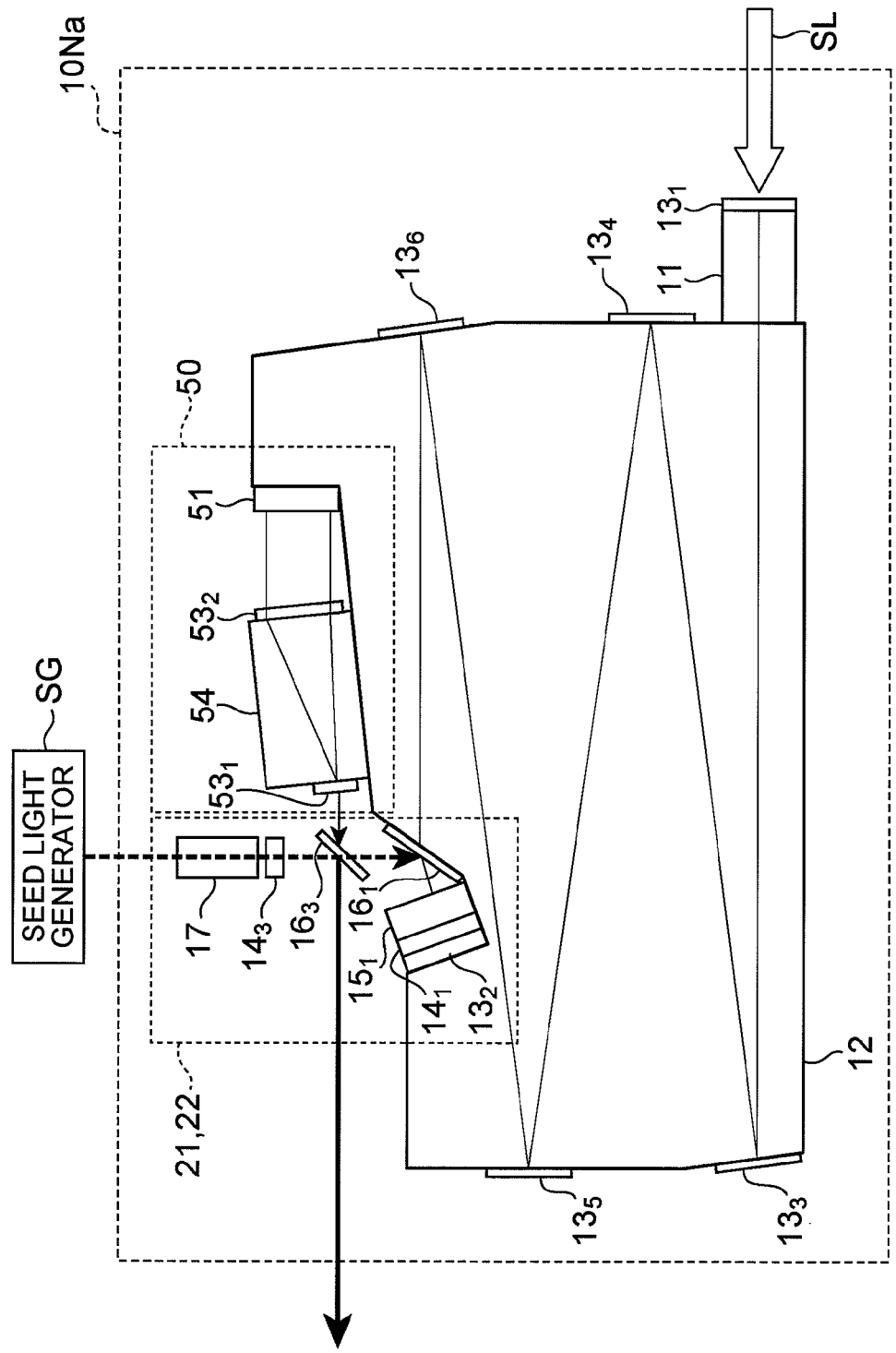
FIG. 20 is a configuration diagram of an optical amplifier 10Na of an exemplary variation of the optical amplifying device of the thirteenth embodiment.

FIG. 20 is a configuration diagram of an optical amplifier 10Na of an exemplary variation of the optical amplifying device of the thirteenth embodiment. In this figure, the illustration of the energy supplier is also omitted, however, it introduces excitation light into the optical amplifying medium 11 from an appropriate position. Via the mirror 13₁, semiconductor laser light SL as excitation light is made incident on the inside of the optical amplifying medium 11 disposed in a resonant optical path. The optical amplifier 10Na shown in this figure is different from the configuration shown in FIG. 19 in that the pulse compressor 50 is also optically joined and integrated as well as the optical amplifying medium 11, the transparent medium 12, the mirrors 13₁ to 13₆ constituting the optical resonator, and a part of the light taking-in means 21 (commonly serving as the light taking-out means 22). The pulse compressor 50 shown in this figure has the same configuration as that of the pulse compressor 50c shown in FIG. 14. By integrating the pulse compressor 50 as well, further downsizing can be realized.

Herein, instead of optical joining of the respective components, it is also allowed that optical elements having the respective functions are formed in the transparent medium 12 and integrated by using an optical machining technique using femtosecond laser light, etc.

Figure 21:
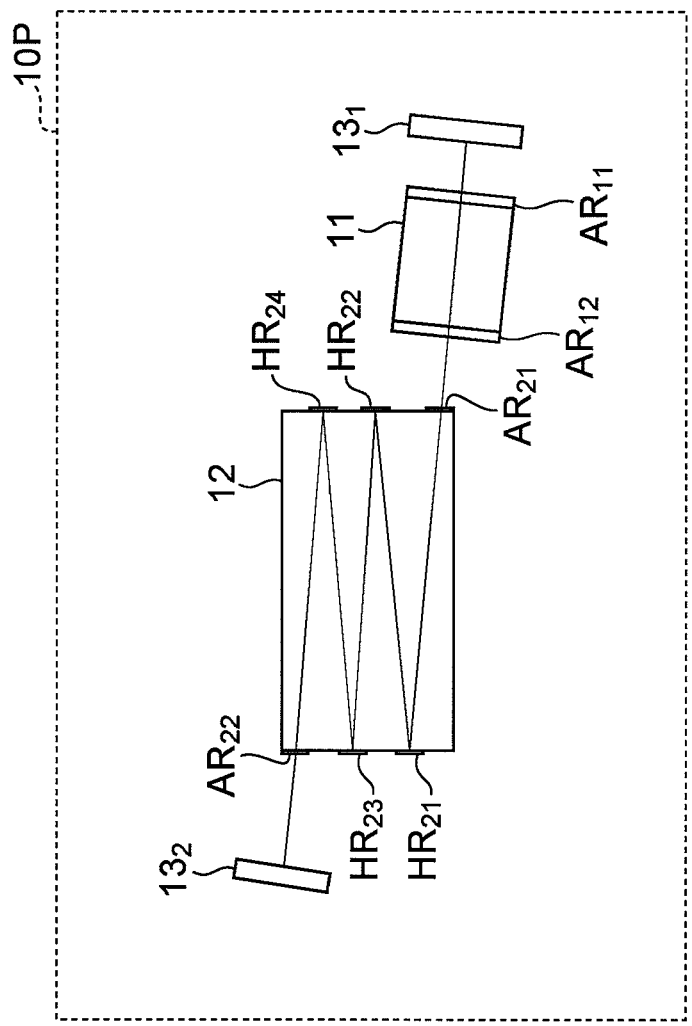
FIG. 21 is a configuration diagram of an optical amplifier 10P of an optical amplifying device of a fourteenth embodiment.

FIG. 21 is a configuration diagram of an optical amplifier 10P of an optical amplifying device of a fourteenth embodiment. In this figure, illustration of the energy supplier is also omitted, however, it introduces excitation light into the optical amplifying medium 11 from an appropriate position. In the optical amplifier 10P shown in this figure, portions where light is made incident on and emitted from the optical amplifying medium 11 are coated with low-reflection coatings $AR_{11}$ and $AR_{12}$, portions where light is made incident on and emitted from the transparent medium 12 are coated with low-reflection coatings $AR_{21}$ and $AR_{22}$, and portions on which light is reflected from the transparent medium 12 are coated with high-reflection coatings $HR_{21}$ to $HR_{24}$.

In comparison with the case where the low-reflection coatings are not coated, the reflectance is decreased, and loss when light is made incident on and emitted from the light amplifying medium 11 or the transparent medium 12 is reduced by coating the low-reflection coatings. In comparison with the case where the high-reflection coatings are not coated, the reflectance is increased by coating the high-reflection coatings. The high-reflection coatings $HR_{21}$ to $HR_{24}$ on the transparent medium 12 serve as mirrors integrated with the transparent medium 12.

The low-reflection coatings and the high-reflection coatings can be realized by a dielectric multilayer. The high-reflection coatings can be realized even by a metal film. The low-reflection coatings or the high-reflection coatings are directly formed on the optical amplifying medium 11 or the transparent medium 12, so that stable operations can be realized without the need for adjustments.

Additionally, a grating film may be formed on the wall faces of the transparent medium 12, and not only a function as a mirror but also a function of extending the pulsed light temporally can be added. In this case, the same function as the pulse stretcher is provided, so that the pulse stretcher can be downsized, and there is no need to provide the pulse stretcher separately.

Figure 22:
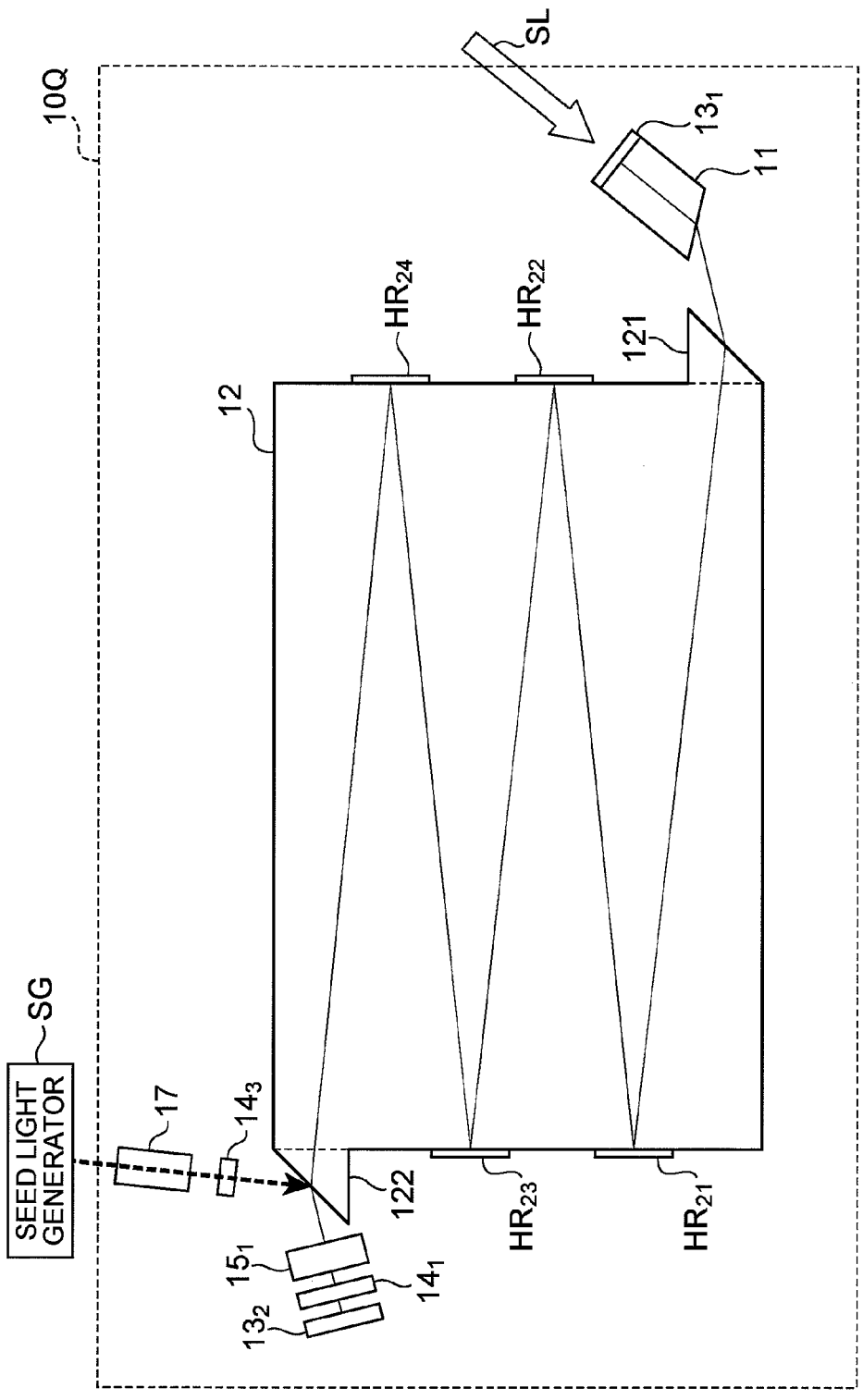
FIG. 22 is a configuration diagram of an optical amplifier 10Q of an optical amplifying device of a fifteenth embodiment.

FIG. 22 is a configuration diagram of an optical amplifier 10Q of the optical amplifying device of the fifteenth embodiment. In this figure, the illustration of the energy supplier is also omitted, however, it introduces excitation light into the optical amplifying medium 11 from an appropriate position. Via the mirror 13₁, semiconductor laser light SL as excitation light is made incident on the inside of the optical amplifying medium 11 disposed in a resonant optical path. In the optical amplifier 10Q shown in this figure, portions on which light is reflected from the transparent medium 12 are coated with high-reflection coatings $HR_{21}$ to $HR_{24}$. Light incidence and emission angles at portions where light is made incident on or emitted from on the optical amplifying medium 11 and the transparent medium 12 are Brewster angles, and the shapes and arrangement of the optical amplifying medium 11 and the transparent medium 12, respectively, are set so that the angles become the Brewster angles.

As shown in this figure, by attaching triangle blocks 121 and 122 made of the same material as that of the transparent medium 12 onto the light incidence and emission portions of the transparent medium 12, the light incidence and emission angles can be set to Brewster angles and loss when light is made incident or emitted can be reduced. To attach the triangle blocks 121 and 122, an optical adhesive or an optical contact technique may be used. By using the portion having a Brewster angle as an input/output coupler with respect to the polarization direction of the light, the same operation as a polarization beam splitter can be realized.

Figure 23:
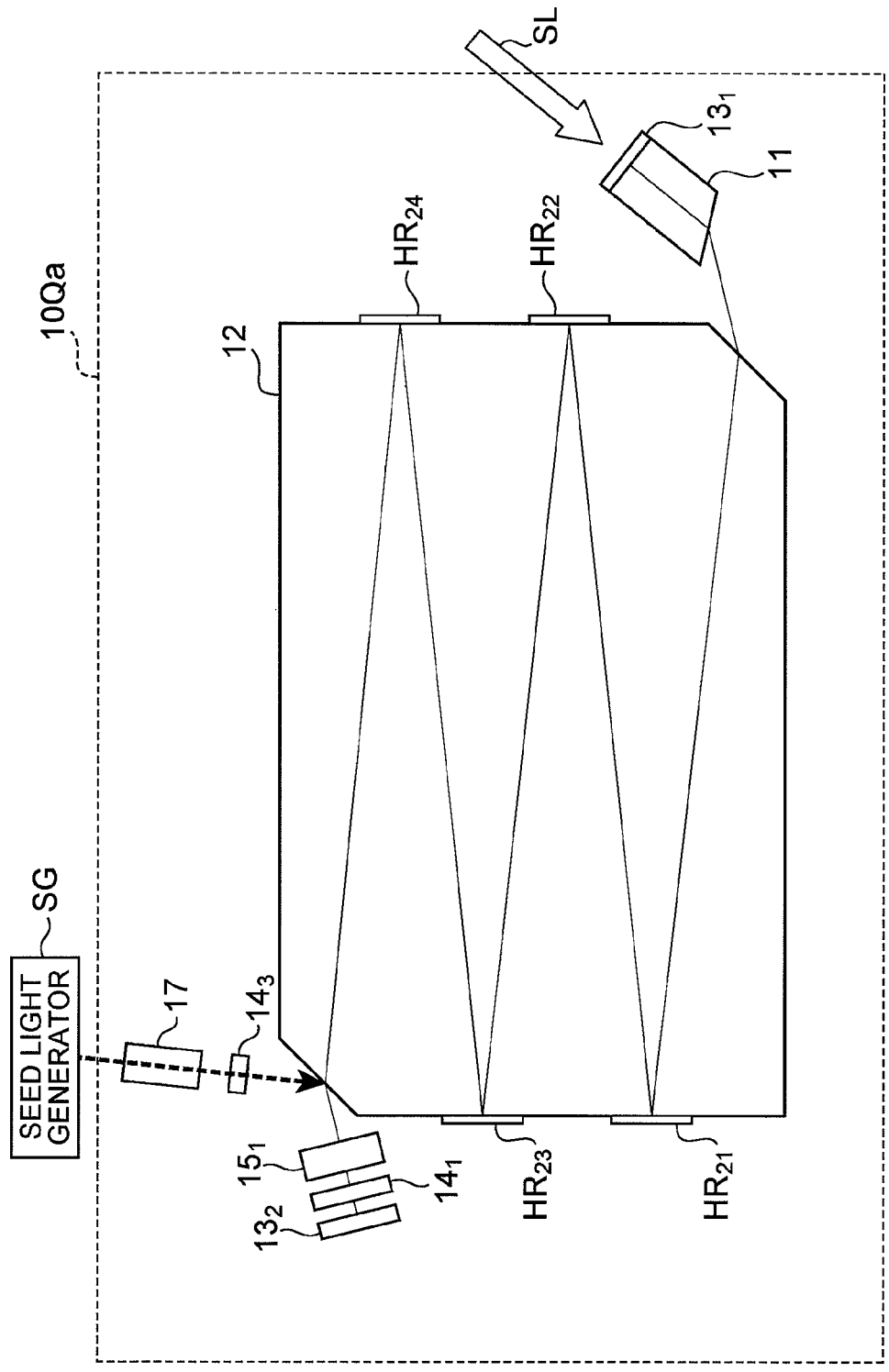
FIG. 23 is a configuration diagram of an optical amplifier 10Qa of an exemplary variation of the optical amplifying device of the fifteenth embodiment.

FIG. 23 is a configuration diagram of an optical amplifier 10Qa of an exemplary variation of the optical amplifying device of the fifteenth embodiment. In the configuration shown in FIG. 22, triangle blocks 121 and 122 are attached to the transparent medium 12, and on the other hand, in the configuration shown in FIG. 23, the light incidence and emission angles are set to Brewster angles by correcting the shapes of the light incidence and emission portions of the transparent medium 12. In this case, by using the portion with the Brewster angle as an input/output coupler with respect to the polarization direction of the light, the same operation as the polarization beam splitter can also be realized.

Figure 24:
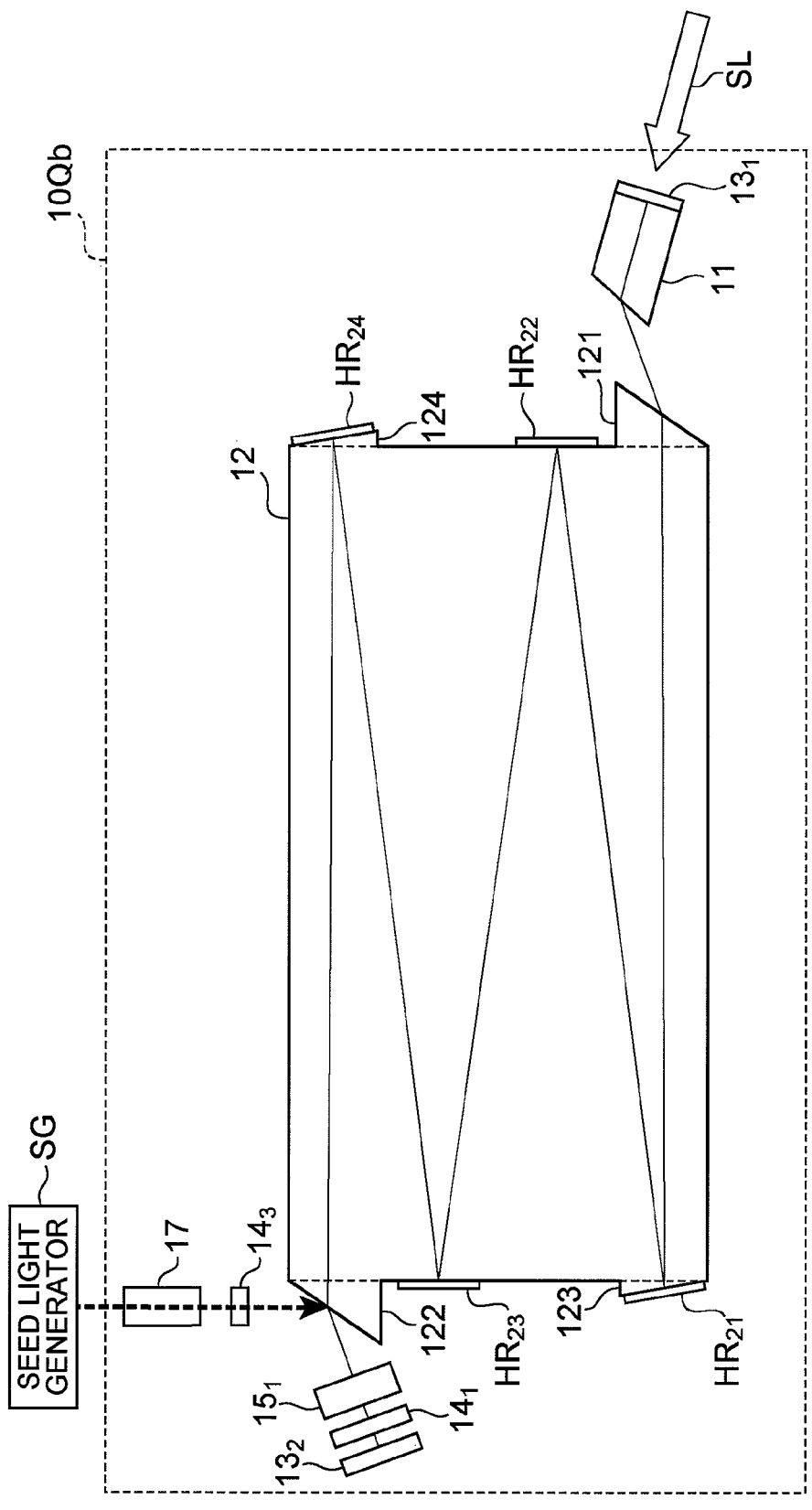
FIG. 24 is a configuration diagram of an optical amplifier 10Qb of an exemplary variation of the optical amplifying device of the fifteenth embodiment.

FIG. 24 is a configuration diagram of an optical amplifier 10Qb of an exemplary variation of the optical amplifying device of the fifteenth embodiment. In the configuration shown in FIG. 22, high-reflection coatings $HR_{21}$ to $HR_{24}$ coated onto portions where light is reflected from the transparent medium 12 are parallel to each other, and on the other hand, in the configuration shown in FIG. 24, the high-reflection coatings $HR_{21}$ and $HR_{24}$ slope. In addition, triangle blocks 123 and 124 made of the same material as that of the transparent medium 12 are attached to reflecting portions of the transparent medium 12 so that the high-reflection coatings $HR_{21}$ and $HR_{24}$ will slope, and these triangle blocks 123 and 124 are coated with the high-reflection coatings $HR_{21}$ and $HR_{24}$. By designing appropriately the angles of the triangle blocks 123 and 124, an optical path can be set so that light is reflected at an arbitrary angle to the inside of the transparent medium 12.

Figure 25:
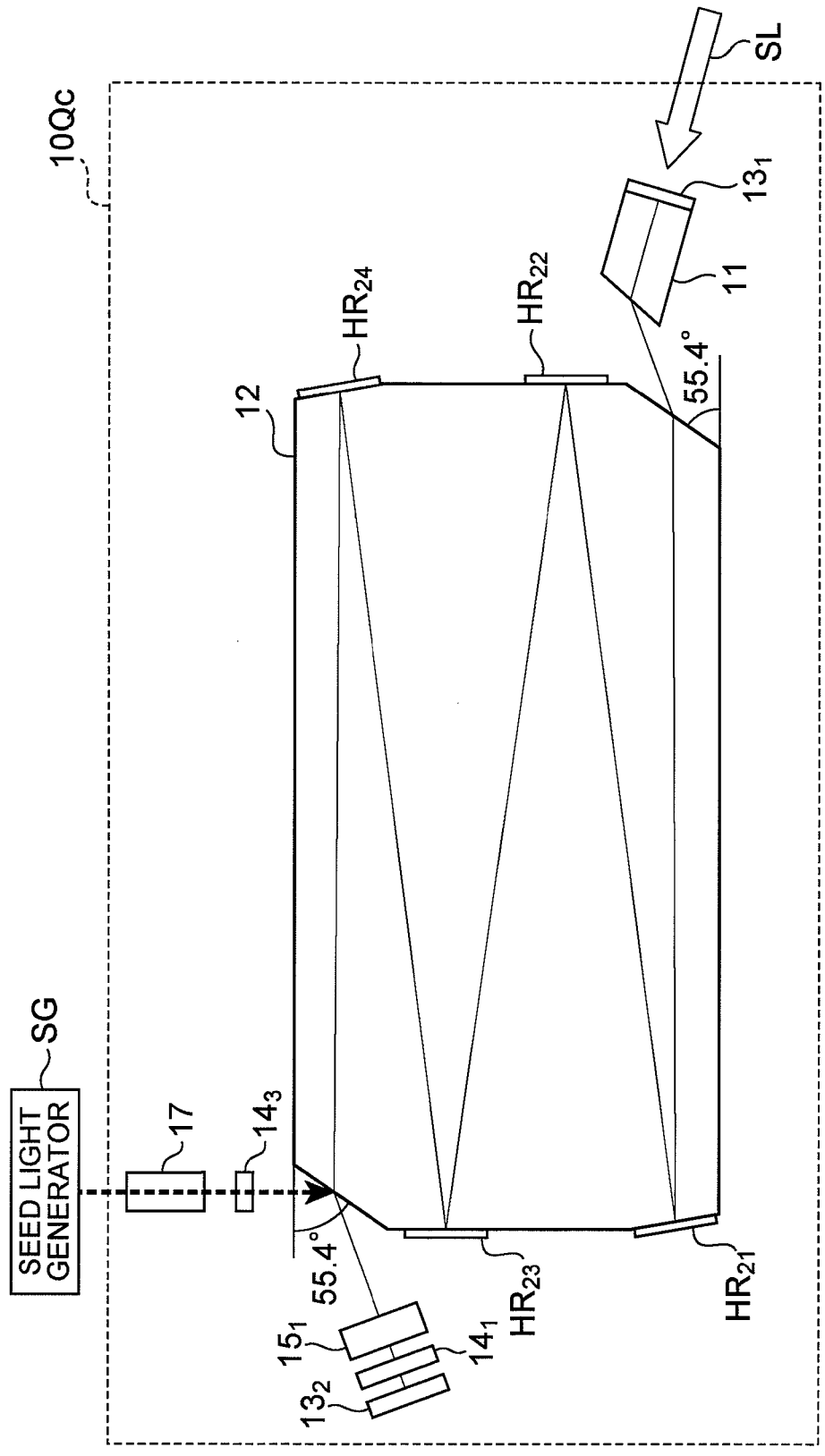
FIG. 25 is a configuration diagram of an optical amplifier 10Qc of an exemplary variation of the optical amplifying device of the fifteenth embodiment.

FIG. 25 is a configuration diagram of an optical amplifier 10Qc of an exemplary variation of the optical amplifying device of the fifteenth embodiment. In the configuration shown in FIG. 23, high-reflection coatings $HR_{21}$ to $HR_{24}$ coated onto portions where light is reflected from the transparent medium 12 are parallel to each other, and on the other hand, in the configuration shown in FIG. 25, the high-reflection coatings $HR_{21}$ and $HR_{24}$ slope. In addition, the triangle blocks are attached to the transparent medium 12 to slope the high-reflection coatings $HR_{21}$ and $HR_{24}$ in the configuration shown in FIG. 24, and on the other hand, in the configuration shown in FIG. 25, the high-reflection coatings $HR_{21}$ and $HR_{24}$ are sloped by correcting the shapes of the reflecting portions of the transparent medium 12. Thus, the same effect is obtained even by forming appropriate angles on the transparent medium 12 and coating the high-reflection coatings instead of attaching triangle blocks.

The transparent medium 12 described above is schematically a rectangular parallelepiped shape, and light is made incident on one end face and light is emitted from an opposite end face thereto, and light reciprocates between both end faces. However, there may be various exemplary variations of the shape of the transparent medium 12 and the optical path of light inside the transparent medium 12. FIG. 26 to FIG. 30 are views showing various configuration examples of the transparent medium 12 in an optical amplifying device of a sixteenth embodiment, respectively.

Figure 26:
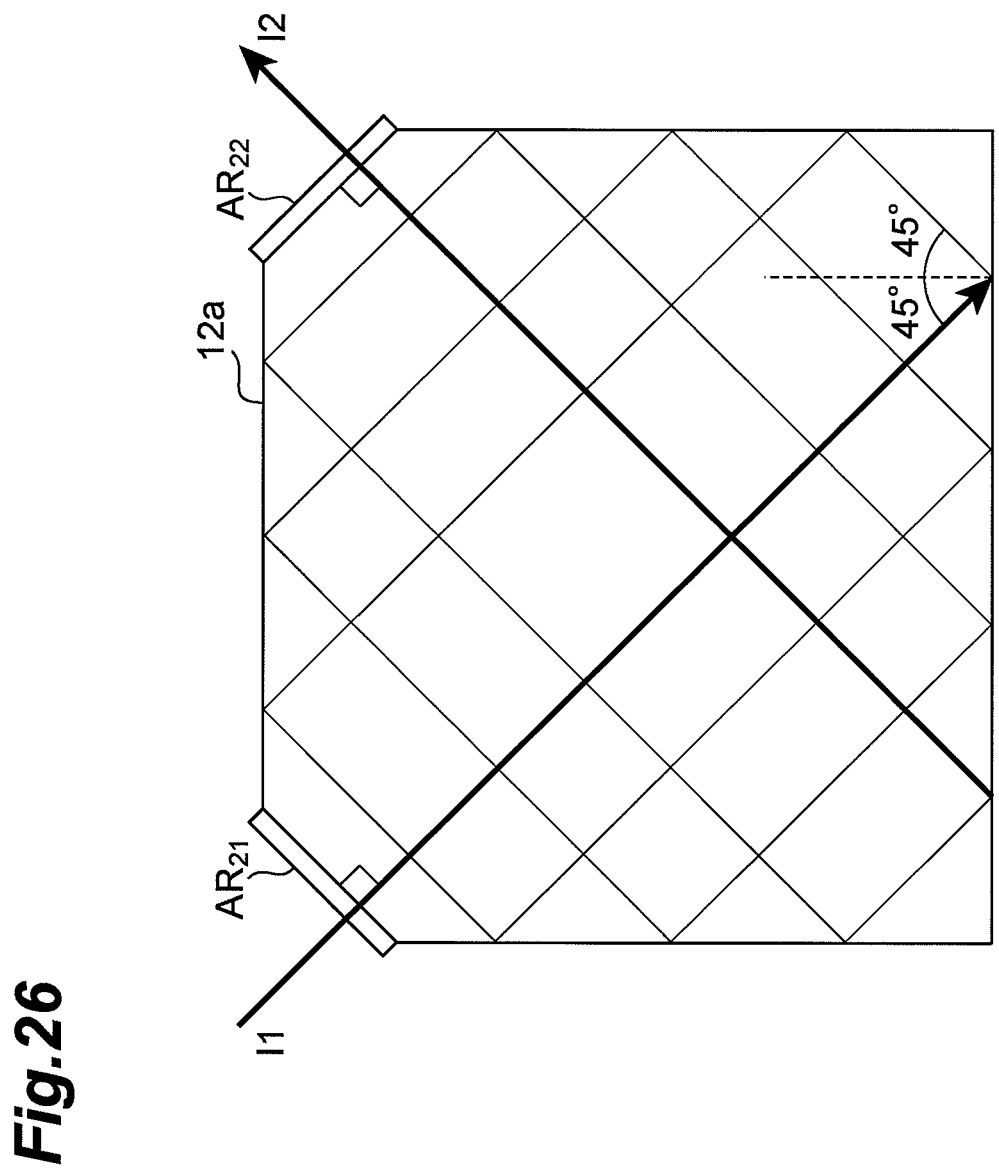
FIG. 26 is a view showing a configuration example of a transparent medium 12 in an optical amplifying device of a sixteenth embodiment.

The transparent medium 12a shown in FIG. 26 is schematically a rectangular parallelepiped shape, and a certain corner of the rectangular section is chamfered and coated with a low-reflection coating $AR_{21}$, and another certain corner is chamfered and coated with a low-reflection coating $AR_{22}$, and the portions chamfered and coated with the low-reflection coatings $AR_{21}$ and $AR_{22}$ are light incidence and emission portions. In this transparent medium 12a, when light propagating inside is reflected by a wall face, the incidence angle on the wall face is the critical angle or more. For example, when the transparent medium 12a is made of synthetic silica, the refractive index thereof is approximately 1.45, so that the critical angle with air is approximately 43.6 degrees. Therefore, when light propagating inside the transparent medium 12a made of synthetic silica advances at an angle of 45 degrees with the wall face, the light is totally reflected by the wall face (interface of synthetic silica and air). Therefore, in this case, there is no need for a high-reflection coating onto the reflecting portion. The incident light I1 is reflected a plurality of times by the inner face of the side face of the transparent medium 12a so that the optical path of the light propagating inside turns perpendicularly, and is emitted as light I2 from the transparent medium 12a.

Figure 27:
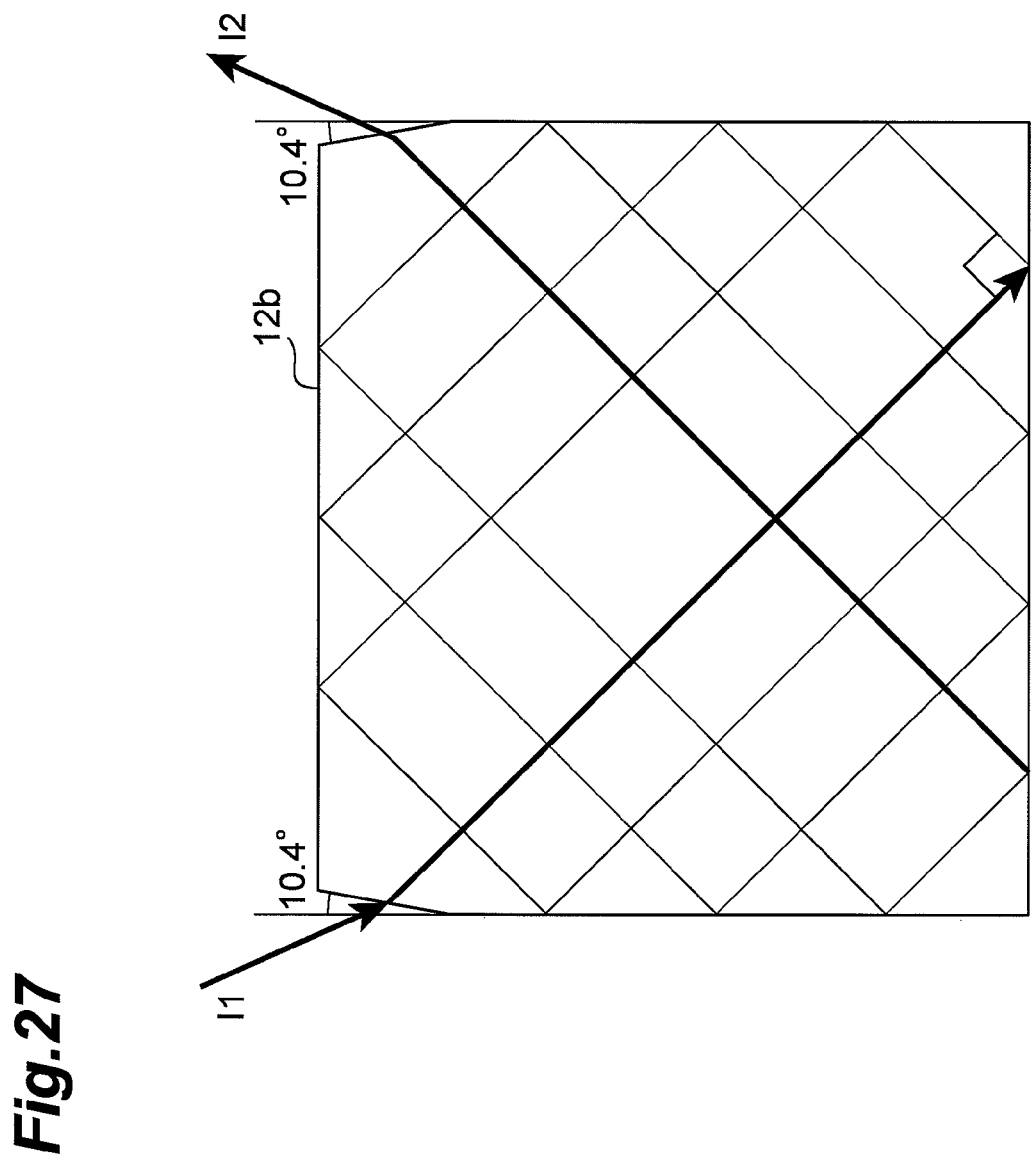
FIG. 27 is a view showing a configuration example of the transparent medium 12 in the optical amplifying device of the sixteenth embodiment.

The transparent medium 12b shown in FIG. 27 is schematically a rectangular parallelepiped shape, and two certain corners of the rectangular section are chamfered, and light is made incident on and emitted from the chamfered portions at a Brewster angle, and light propagating inside advances at an angle of 45 degrees with the wall face of the transparent medium 12b.

In these transparent media 12a and 12b, the light incidence and emission portions are coated with low-reflection coatings or the incidence and emission angle is set to the Brewster angle to make it possible to suppress loss of input and output. For example, when the transparent media 12a and 12b have an approximately 50 mm-square rectangular section, light propagating inside the transparent media 12a and 12b is made to reflect repeatedly at intervals of 7 mm on the wall faces, and accordingly, light can make seven circuits inside the transparent media 12a and 12b, and the optical path extends approximately 1 m. In this case, for example, when the refractive index of the transparent media 12a and 12b is 1.5, an optical path length of approximately 1.5 m is obtained.

Figure 28:
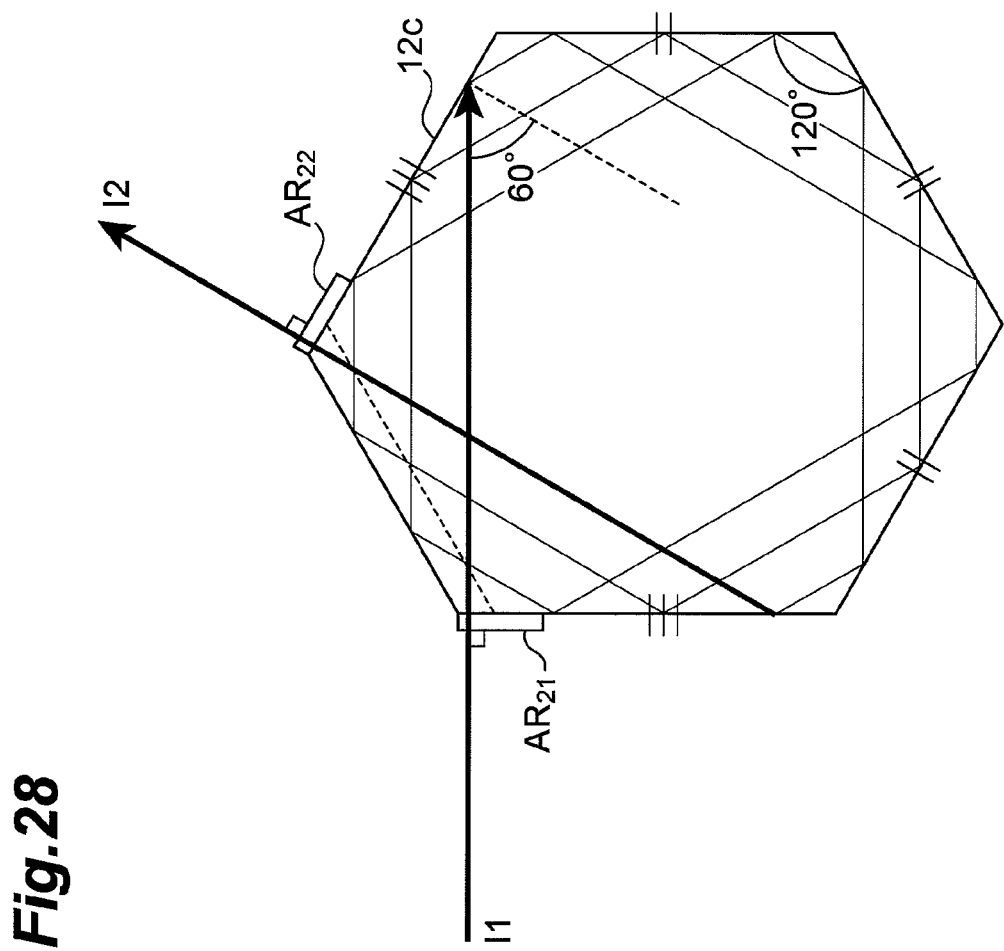
FIG. 28 is a view showing a configuration example of the transparent medium 12 in the optical amplifying device of the sixteenth embodiment.

The transparent medium 12c shown in FIG. 28 has a hexagonal columnar shape. Generally, the transparent medium may have a polygonal column having five or more sides. For example, when the transparent medium is made of synthetic silica, by shaping this transparent medium into a polygonal column having five or more sides, light advancing inside the transparent medium is made incident on the wall face of the transparent medium at an incidence angle of 45 degrees or more and totally reflected, so that high-reflection coatings are not necessary. When the transparent medium is shaped into a polygonal column having five or more sides, the reflection angle becomes greater than in the case of a rectangular parallelepiped shape, so that total reflection conditions are easily satisfied. Light I1 made incident on the transparent medium 12c advances while circuiting around the axis of the polygonal column inside the transparent medium 12c, and is emitted as light I2. The optical path of the light propagating inside the transparent medium 12c turns at substantially the same angle as the angle of the polygon side faces of the transparent medium 12c.

As shown in this figure, by forming the polygonal columnar shape by extending a part of a square column, it is possible to dispose such that light propagating inside the transparent medium advances so as to circuit inside the transparent medium without passing through the same optical path. The respective angles of the polygonal column are the same angle, so that the incidence angles on the wall faces of the transparent medium can also be fixed. By coating low-reflection coatings $AR_{21}$ and $AR_{22}$ to the light incidence and emission portions, loss of light incidence and emission can be suppressed. Herein, particularly when the polygonal column is a hexagonal column, the light input and output faces can be constructed so as to be made to have 90 degrees with the optical axis. By coating low-reflection coatings $AR_{21}$ and $AR_{22}$ to the input and output portions, loss can be further reduced. Further, even in this case, the input and output portions may have shapes with the Brewster angle.

Figure 29:
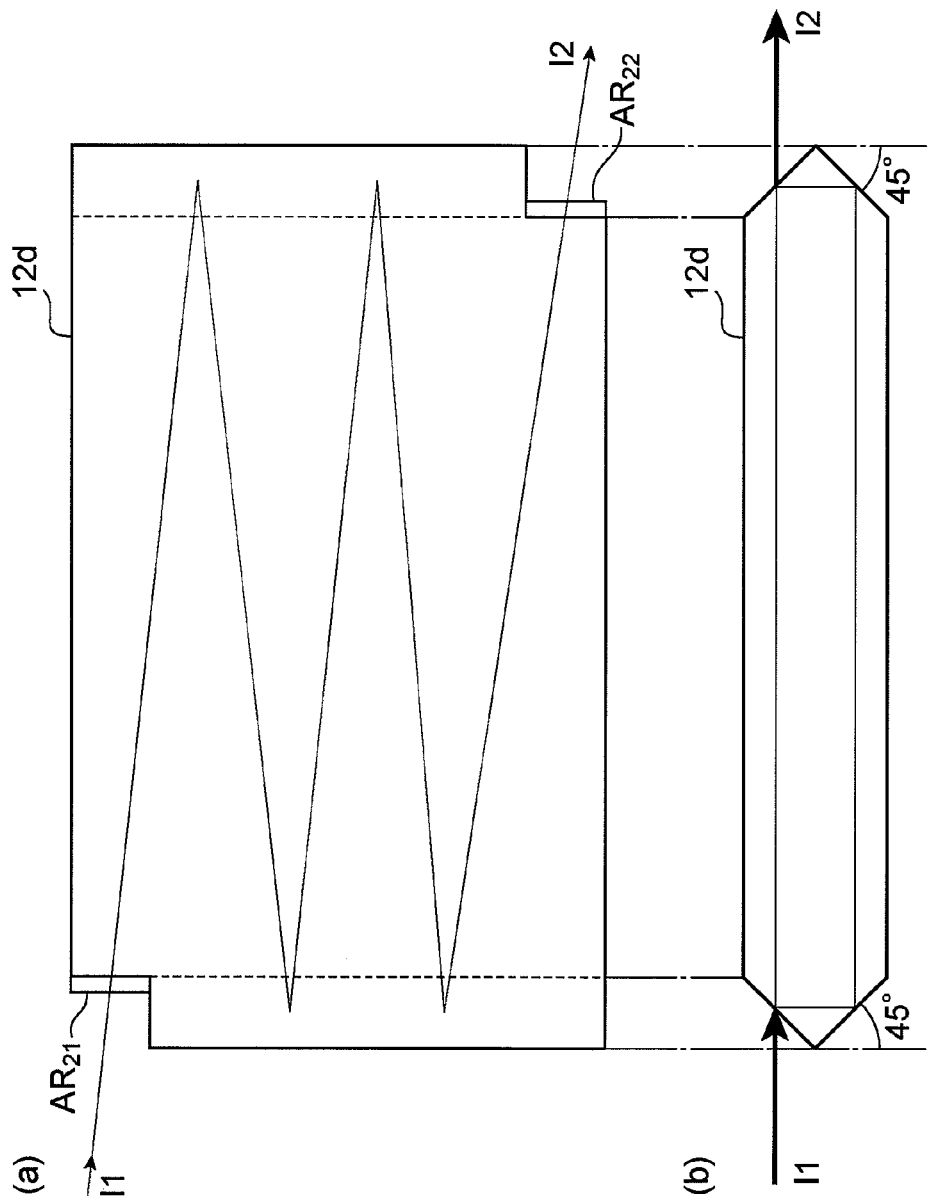
FIG. 29 is a view showing a configuration example of the transparent medium 12 in the optical amplifying device of the sixteenth embodiment.

The transparent medium 12d shown in FIG. 29 has light incidence portions coated with low-reflection coatings $AR_{21}$ and $AR_{22}$, and the wall faces of the reflecting portions are sloped so that light propagating inside is made incident on the wall face (other than the light incidence portions) at an incidence angle of 45 degrees. This FIG. 29(a) is a plan view, and FIG. 29(b) is a sectional view. For example, when the transparent medium 12d is made of synthetic silica, light propagating inside is made incident on the reflecting portions at an incidence angle of the critical angle or more, and is totally reflected perpendicularly, so that there is no need to coat high-reflection coatings onto the wall faces. The wall faces may be shaped so as to totally reflect the light at an angle of 45 degrees horizontally. Light I1 made incident on the transparent medium 12d is reflected a plurality of times inside while changing its height in the thickness direction, and is output as light I2 to the outside.

Figure 30:
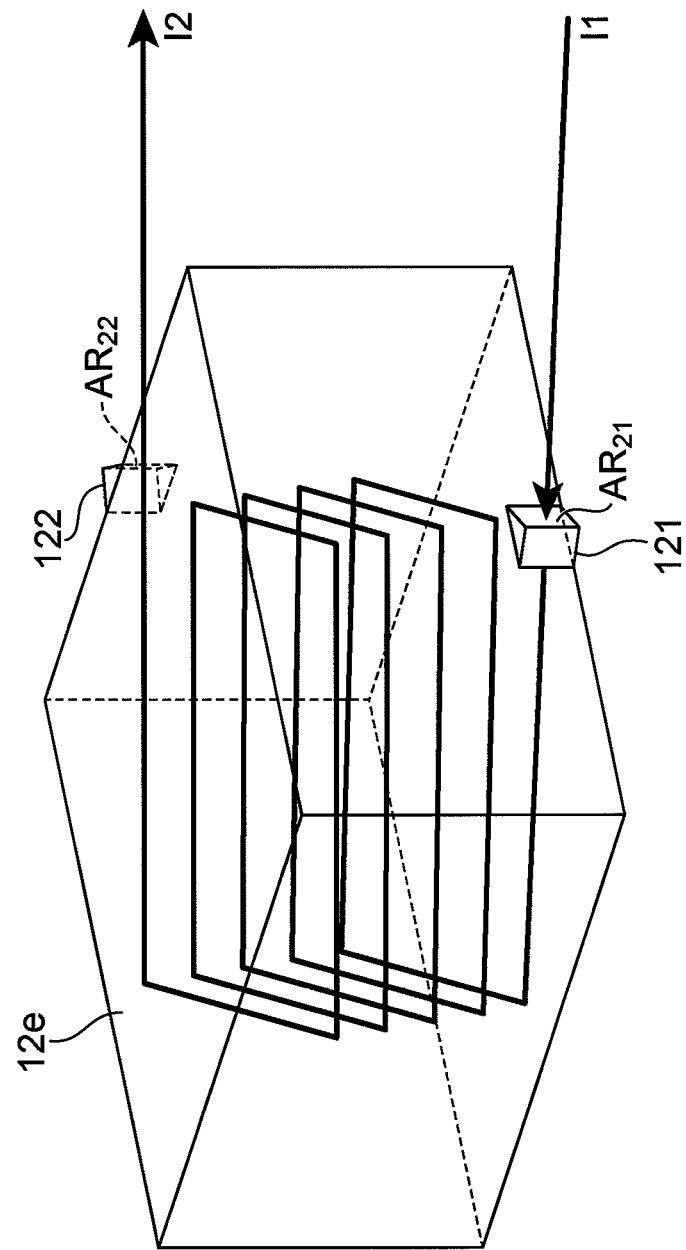
FIG. 30 is a view showing a configuration example of the transparent medium 12 in the optical amplifying device of the sixteenth embodiment.

The transparent medium 12e shown in FIG. 30 is schematically a rectangular parallelepiped shape, triangle blocks 121 and 122 made of the same material are attached to light incidence and emission portions, and light incidence and emission faces of the triangle blocks 121 and 122 are coated with low-reflection coatings $AR_{21}$ and $AR_{22}$. This transparent medium 12e repeatedly totally reflects the light I1 input into the low-reflection coating $AR_{21}$ of the triangle block 121 by the respective wall faces and makes the light advance spirally, and thereafter, outputs the light I2 to the outside from the low-reflection coating $AR_{22}$ of the triangle block 122. For example, in the case where the transparent medium 12e is made of synthetic silica, when light propagating inside the transparent medium 12e advances at an angle of 45 degrees with the wall faces, it is totally reflected by the respective wall faces, so that the wall faces do not need to be coated with the low-reflection coatings.

Further, by configuring to slightly incline the optical path inside the transparent medium 12e vertically as well, light propagates spirally inside the transparent medium 12, so that a long optical path length can be obtained. Herein, the shape of the transparent medium may be a polygonal columnar shape having five or more sides. By shaping the input and output portions so as to have an appropriate angle with the optical axis and coating low-reflection coatings to these, or by shaping so as to have the Brewster angle, loss of input and output can be suppressed.

A part or the whole of the transparent members 12a to 12e may commonly serve as the optical amplifying medium 11.

Figure 31:
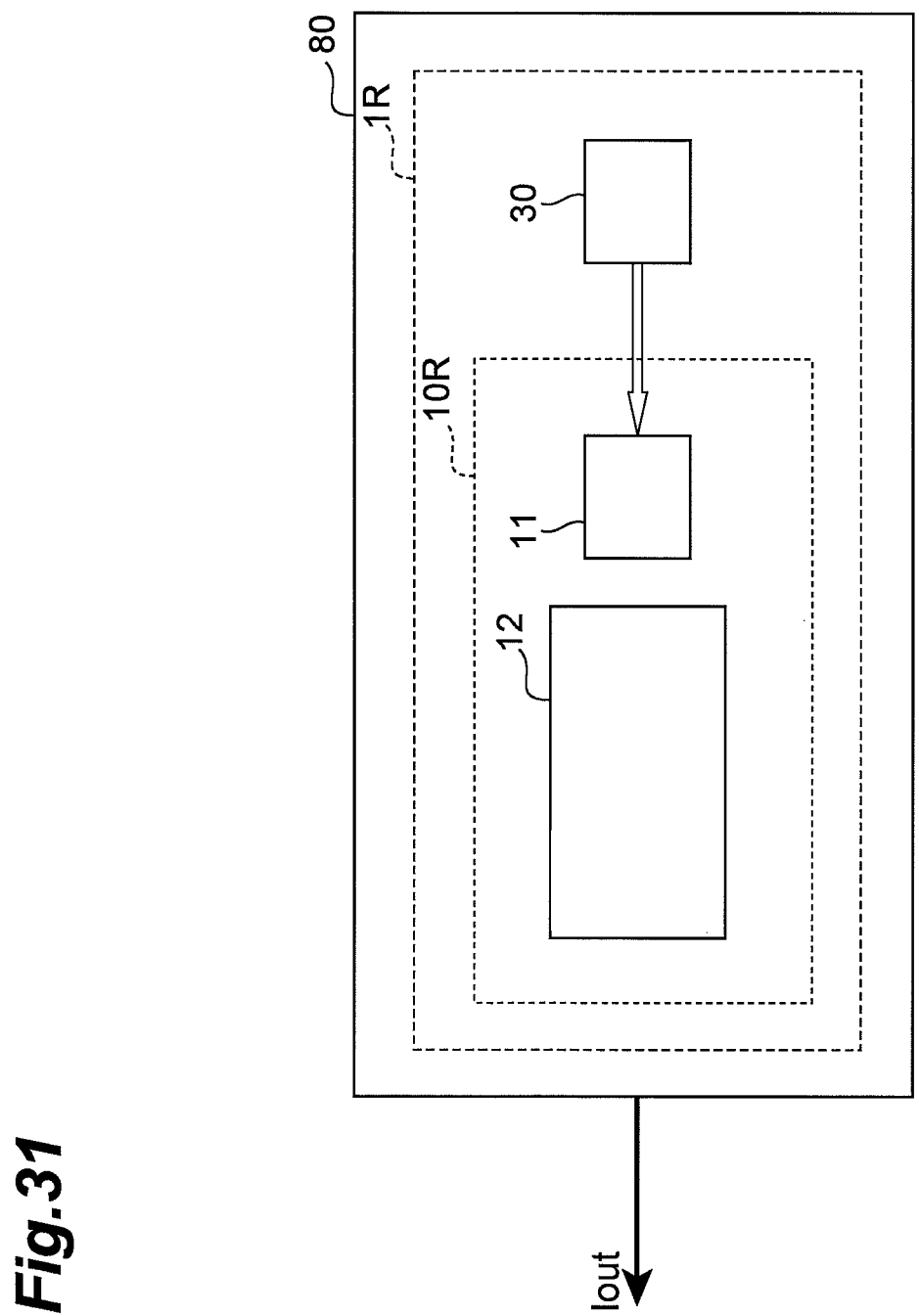
FIG. 31 is a configuration diagram of an optical amplifying device 1R of a seventeenth embodiment.

FIG. 31 is a configuration diagram of an optical amplifying device 1R of a seventeenth embodiment. The optical amplifying device 1R shown in this figure includes an optical amplifier 10R including an optical amplifying medium 11 and a transparent medium 12, and an energy supplier 30, and these optical amplifier 10R and the energy supplier 30 are put in a vacuum vessel 80. A reduced-pressure atmosphere can be made in the internal space of the vacuum vessel 80. In this case, by propagating light in vacuum, stabilization is realized. For example, when the seed light generator and the energy supplier are stable by themselves or these do not make propagation in the atmosphere like a fiber laser light source, they may be set outside the vacuum vessel 80.

INDUSTRIAL APPLICABILITY

The present invention can be applied to an optical amplifying device.

The invention claimed is:

1. An optical amplifying device comprising:
an optical amplifier including
an optical amplifying medium which optically amplifies to-be-amplified light, and
a transparent medium configured to propagate the amplified light; and
an energy supplier configured to supply excitation energy to the optical amplifying medium,
wherein a plurality of components including the optical amplifying medium and the transparent medium of the optical amplifier are integrated,
wherein the transparent medium has:
a light input portion configured to input the amplified light;
at least four inner faces configured to reflect the amplified light in the transparent medium; and
a light output portion configured to output the amplified light, wherein the amplified light from the input portion travels in the transparent medium so as to circle at least two times in the transparent medium from being reflected by the at least four inner faces of the transparent medium.

2. The optical amplifying device according to claim 1, wherein the optical amplifier inputs the to-be-amplified light from the outside and optically amplifies the to-be-amplified light by making amplified light thereof pass through the optical amplifying medium a plurality of times.

3. The optical amplifying device according to claim 1, wherein the optical amplifier includes an optical resonator, and has the optical amplifying medium and the transparent medium on a resonant optical path of the optical resonator, and
wherein the optical resonator is integrated together with the integrated optical amplifying medium and the transparent medium.

4. The optical amplifying device according to claim 3, wherein
the optical amplifier further includes:
a light taking-in means which is provided on the resonant optical path and takes-in to-be-amplified light into the resonant optical path from the outside of the optical resonator; and
a light taking-out means which is provided on the resonant optical path and takes-out the to-be-amplified light which was optically amplified inside the optical resonator for a predetermined period to the outside of the optical resonator,
wherein the light taking-in means and the light taking-out means are integrated together with the integrated optical amplifying medium and the transparent medium.

5. An optical amplifying device, wherein
the optical amplifying device as set forth in claim 3 is used as a first optical amplifying device,
light generated from the first optical amplifying device is used as seed light,
the seed light is optically amplified by a second optical amplifying device and output, and
the second optical amplifying device is an optical amplifying device comprising:
a second optical amplifier including
a second optical amplifying medium which optically amplifies to-be-amplified light, and
a second transparent medium which the to-be-amplified light passes a plurality of times through; and
a second energy supplier which supplies excitation energy to the second optical amplifying medium,
wherein the second optical amplifier inputs the to-be-amplified light from the outside and optically amplifies the to-be-amplified light by making amplified light thereof pass through the second optical amplifying medium a plurality of times.

6. The optical amplifying device according to claim 5, wherein the first optical amplifying device and the second optical amplifying device share the optical amplifying media, the transparent media or the energy suppliers.

7. The optical amplifying device according to claim 1, wherein the to-be-amplified light is pulsed light.

8. The optical amplifying device according to claim 7, further comprising:
an optical delay system which delays light, wherein
the optical amplifying device uses light generated by the optical amplifier as seed light, delays the seed light by the optical delay system, and optically amplifies the delayed seed light by the optical amplifier and outputs it.

9. The optical amplifying device according to claim 7, further comprising: a pulse stretcher which stretches the pulse duration of the to-be-amplified light to be input into the optical amplifying medium, wherein the pulse stretcher is integrated together with the integrated optical amplifying medium and the transparent medium.

10. The optical amplifying device according to claim 7, wherein the transparent medium extends the pulse width of the to-be-amplified light to be input into the optical amplifying medium.

11. The optical amplifying device according to claim 7, further comprising: a pulse compressor which compresses the pulse duration of the to-be-amplified light which is optically amplified and output from the optical amplifying medium,
wherein the pulse compressor is integrated together with the integrated optical amplifying medium and the transparent medium.

12. The optical amplifying device according to claim 1, wherein at least either the optical amplifying medium or the transparent medium is solid.

13. The optical amplifying device according to claim 12, further comprising:
a Peltier element provided in contact with the optical amplifying medium,
a power source which supplies electric power to the Peltier element, and
a radiator provided in contact with the Peltier element.

14. The optical amplifying device according to claim 1, wherein the energy supplier includes a semiconductor laser element which enables to provide in the form of light the excitation energy that the energy supplier should supply to the optical amplifying medium.

15. The optical amplifying device according to claim 1, wherein the optical amplifier further includes an optical path adjusting means for adjusting the optical path of the to-be-amplified light.

16. The optical amplifying device according to claim 1, wherein any portion at which the to-be-amplified light is made incident on or emitted from in the optical amplifying medium or the transparent medium is coated with a low-reflection coating.

17. The optical amplifying device according to claim 1, wherein any portion at which the to-be-amplified light is reflected in the optical amplifying medium or the transparent medium is coated with a high-reflection coating.

18. The optical amplifying device according to claim 1, wherein a light incidence/emission angle at any portion which the to-be-amplified light is made incident on or emitted from in the optical amplifying medium or the transparent medium is a Brewster angle.

19. The optical amplifying device according to claim 1, wherein the transparent medium totally reflects the to-be-amplified light propagating inside by wall faces inside.

20. The optical amplifying device according to claim 1, further comprising: a vacuum vessel which has the optical amplifier and the energy supplier in its internal space, and makes a reduced-pressure atmosphere in the internal space.

21. An optical amplifying device, wherein
the optical amplifying device as set forth in claim 3 is used as a first optical amplifying device,
light generated from the first optical amplifying device is used as seed light,
the seed light is optically amplified by a second optical amplifying device and output, and
the second optical amplifying device is an optical amplifying device comprising:
a second optical amplifier including:
a second optical amplifying medium which optically amplifies to-be-amplified light, and
a second transparent medium which the to-be-amplified light passes a plurality of times through; and
a second energy supplier which supplies excitation energy to the second optical amplifying medium,
wherein the second optical amplifier includes a second optical resonator, and has the second optical amplifying medium and the second transparent medium on a resonant optical path of the second optical resonator,
wherein the second optical amplifier further includes:
a light taking-in means which is provided on the resonant optical path and takes-in to-be-amplified light into the resonant optical path from the outside of the second optical resonator; and
wherein a light taking-out means which is provided on the resonant optical path and takes-out the to-be-amplified light which was optically amplified inside the second optical resonator for a predetermined period to the outside of the second optical resonator.

22. The optical amplifying device according to claim 12, further comprising:
a Peltier element provided in contact with the transparent medium,
a power source which supplies electric power to this Peltier element,
a water-cooling radiator provided in contact with the Peltier element,
a circulation pump for supplying cooling water to the water-cooling radiator via a water channel, and
a water tank to which cooling water discharged from the water-cooling radiator returns via the water channel.

23. An optical amplifying device according to claim 1, wherein the transparent medium has:
a rectangular parallelepiped shape, or
a polygonal column having five or more sides, and
wherein the light made incident on the transparent medium is totally reflected by the at least four inner faces of the transparent medium to advance while circuiting inside the transparent medium.

* * * * *